US008051425B2

(12) United States Patent
Godman et al.

(10) Patent No.: US 8,051,425 B2
(45) Date of Patent: Nov. 1, 2011

(54) DISTRIBUTED SYSTEM WITH ASYNCHRONOUS EXECUTION SYSTEMS AND METHODS

(75) Inventors: Peter J. Godman, Seattle, WA (US); Darren P. Schack, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 1566 days.

(21) Appl. No.: 11/262,308

(22) Filed: Oct. 28, 2005

(65) Prior Publication Data

US 2006/0101062 A1 May 11, 2006

Related U.S. Application Data

(60) Provisional application No. 60/623,846, filed on Oct. 29, 2004, provisional application No. 60/628,527, filed on Nov. 15, 2004.

(51) Int. Cl.
*G06F 9/46* (2006.01)
*G06F 15/16* (2006.01)

(52) U.S. Cl. ......... 718/106; 718/102; 709/219; 709/227

(58) Field of Classification Search .................. None
See application file for complete search history.

(56) References Cited

U.S. PATENT DOCUMENTS

| 5,163,131 | A | 11/1992 | Row et al. |
|---|---|---|---|
| 5,181,162 | A | 1/1993 | Smith et al. |
| 5,212,784 | A | 5/1993 | Sparks |
| 5,230,047 | A | 7/1993 | Frey et al. |
| 5,251,206 | A | 10/1993 | Calvignac et al. |
| 5,258,984 | A | 11/1993 | Menon et al. |
| 5,329,626 | A | 7/1994 | Klein et al. |
| 5,359,594 | A | 10/1994 | Gould et al. |
| 5,403,639 | A | 4/1995 | Belsan et al. |
| 5,459,871 | A * | 10/1995 | Van Den Berg ............... 718/104 |
| 5,481,699 | A * | 1/1996 | Saether ............................ 714/15 |
| 5,548,724 | A | 8/1996 | Akizawa et al. |
| 5,548,795 | A * | 8/1996 | Au .................................. 710/52 |
| 5,568,629 | A | 10/1996 | Gentry et al. |
| 5,596,709 | A | 1/1997 | Bond et al. |
| 5,606,669 | A | 2/1997 | Bertin et al. |

(Continued)

FOREIGN PATENT DOCUMENTS

EP 0774723 5/1997

(Continued)

OTHER PUBLICATIONS

Wei-Min Shen and Behnam Salemi; Distributed and Dynamic Task Reallocation in Robot Organizations; IEEE 2002; pp. 1019-1024.*

(Continued)

*Primary Examiner* — Meng An
*Assistant Examiner* — Abdullah Al Kawsar
(74) *Attorney, Agent, or Firm* — Knobbe Martens Olson & Bear, LLP

(57) ABSTRACT

Systems and methods are provided for reducing latency in distributed systems by executing commands as sufficient information and system resources become available. In one embodiment, commands in a transaction include dependency information and an execution engine is configured to execute the commands as the dependencies become satisfied. In some embodiments, the commands also include priority information. If sufficient resources are not available to execute two or more commands with satisfied dependencies, the execution engine determines an order for executing the commands based at least in part on the priority information. In one embodiment, time-intensive commands are assigned a higher priority than commands that are expected to take less time to execute.

16 Claims, 12 Drawing Sheets

U.S. PATENT DOCUMENTS

| | | | |
|---|---|---|---|
| 5,612,865 A | 3/1997 | Dasgupta | |
| 5,649,200 A | 7/1997 | Leblang et al. | |
| 5,657,439 A | 8/1997 | Jones et al. | |
| 5,668,943 A | 9/1997 | Attanasio et al. | |
| 5,680,621 A | 10/1997 | Korenshtein | |
| 5,694,593 A | 12/1997 | Baclawski | |
| 5,696,895 A | 12/1997 | Hemphill et al. | |
| 5,734,826 A | 3/1998 | Olnowich et al. | |
| 5,754,756 A | 5/1998 | Watanabe et al. | |
| 5,761,659 A | 6/1998 | Bertoni | |
| 5,774,643 A | 6/1998 | Lubbers et al. | |
| 5,799,305 A | 8/1998 | Bortvedt et al. | |
| 5,805,578 A | 9/1998 | Stirpe et al. | |
| 5,805,900 A | 9/1998 | Fagen et al. | |
| 5,806,065 A | 9/1998 | Lomet | |
| 5,822,790 A | 10/1998 | Mehrotra | |
| 5,862,312 A | 1/1999 | Mann | |
| 5,870,563 A | 2/1999 | Roper et al. | |
| 5,878,410 A | 3/1999 | Zbikowski et al. | |
| 5,878,414 A | 3/1999 | Hsiao et al. | |
| 5,884,046 A | 3/1999 | Antonov | |
| 5,884,098 A | 3/1999 | Mason, Jr. | |
| 5,884,303 A | 3/1999 | Brown | |
| 5,890,147 A | 3/1999 | Peltonen et al. | |
| 5,917,998 A | 6/1999 | Cabrera et al. | |
| 5,933,834 A | 8/1999 | Aichelen | |
| 5,943,690 A | 8/1999 | Dorricott et al. | |
| 5,963,963 A | 10/1999 | Schmuck et al. | |
| 5,966,707 A | 10/1999 | Van Huben et al. | |
| 5,996,089 A | 11/1999 | Mann | |
| 6,000,007 A * | 12/1999 | Leung et al. | 711/105 |
| 6,014,669 A | 1/2000 | Slaughter et al. | |
| 6,021,414 A | 2/2000 | Fuller | |
| 6,029,168 A | 2/2000 | Frey | |
| 6,038,570 A | 3/2000 | Hitz et al. | |
| 6,044,367 A | 3/2000 | Wolff | |
| 6,052,759 A | 4/2000 | Stallmo et al. | |
| 6,055,543 A | 4/2000 | Christensen et al. | |
| 6,055,564 A * | 4/2000 | Phaal | 709/207 |
| 6,070,172 A | 5/2000 | Lowe | |
| 6,081,833 A | 6/2000 | Okamoto et al. | |
| 6,081,883 A | 6/2000 | Popelka et al. | |
| 6,108,759 A | 8/2000 | Orcutt et al. | |
| 6,117,181 A | 9/2000 | Dearth et al. | |
| 6,122,754 A | 9/2000 | Litwin et al. | |
| 6,138,126 A | 10/2000 | Hitz et al. | |
| 6,154,854 A | 11/2000 | Stallmo | |
| 6,173,374 B1 | 1/2001 | Heil et al. | |
| 6,202,085 B1 | 3/2001 | Benson et al. | |
| 6,209,059 B1 | 3/2001 | Ofer et al. | |
| 6,219,693 B1 | 4/2001 | Napolitano et al. | |
| 6,226,377 B1 * | 5/2001 | Donaghue, Jr. | 379/265.13 |
| 6,279,007 B1 | 8/2001 | Uppala | |
| 6,321,345 B1 | 11/2001 | Mann | |
| 6,334,168 B1 | 12/2001 | Islam et al. | |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,393,483 B1 | 5/2002 | Latif et al. | |
| 6,397,311 B1 | 5/2002 | Capps | |
| 6,405,219 B2 | 6/2002 | Saether et al. | |
| 6,408,313 B1 | 6/2002 | Campbell et al. | |
| 6,415,259 B1 * | 7/2002 | Wolfinger et al. | 705/8 |
| 6,421,781 B1 | 7/2002 | Fox et al. | |
| 6,434,574 B1 | 8/2002 | Day et al. | |
| 6,449,730 B2 | 9/2002 | Mann | |
| 6,453,389 B1 | 9/2002 | Weinberger et al. | |
| 6,457,139 B1 | 9/2002 | D'Errico et al. | |
| 6,463,442 B1 | 10/2002 | Bent et al. | |
| 6,496,842 B1 | 12/2002 | Lyness | |
| 6,499,091 B1 | 12/2002 | Bergsten | |
| 6,502,172 B2 | 12/2002 | Chang | |
| 6,502,174 B1 | 12/2002 | Beardsley et al. | |
| 6,523,130 B1 | 2/2003 | Hickman et al. | |
| 6,526,478 B1 | 2/2003 | Kirby | |
| 6,546,443 B1 | 4/2003 | Kakivaya et al. | |
| 6,549,513 B1 | 4/2003 | Chao et al. | |
| 6,557,114 B2 | 4/2003 | Mann | |
| 6,567,894 B1 | 5/2003 | Hsu et al. | |
| 6,567,926 B2 | 5/2003 | Mann | |
| 6,571,244 B1 | 5/2003 | Larson | |
| 6,571,349 B1 | 5/2003 | Mann | |
| 6,574,745 B2 | 6/2003 | Mann | |
| 6,594,655 B2 | 7/2003 | Tal et al. | |
| 6,594,660 B1 | 7/2003 | Berkowitz et al. | |
| 6,594,744 B1 | 7/2003 | Humlicek et al. | |
| 6,598,174 B1 | 7/2003 | Parks et al. | |
| 6,618,798 B1 | 9/2003 | Burton et al. | |
| 6,631,411 B1 * | 10/2003 | Welter et al. | 709/224 |
| 6,658,554 B1 * | 12/2003 | Moshovos et al. | 712/216 |
| 6,662,184 B1 | 12/2003 | Friedberg | |
| 6,671,686 B2 | 12/2003 | Pardon et al. | |
| 6,671,704 B1 | 12/2003 | Gondi et al. | |
| 6,671,772 B1 | 12/2003 | Cousins | |
| 6,687,805 B1 | 2/2004 | Cochran | |
| 6,725,392 B1 | 4/2004 | Frey et al. | |
| 6,732,125 B1 | 5/2004 | Autrey et al. | |
| 6,742,020 B1 * | 5/2004 | Dimitroff et al. | 709/217 |
| 6,748,429 B1 | 6/2004 | Talluri et al. | |
| 6,801,949 B1 | 10/2004 | Bruck et al. | |
| 6,848,029 B2 | 1/2005 | Coldewey | |
| 6,856,591 B1 | 2/2005 | Ma et al. | |
| 6,871,295 B2 | 3/2005 | Ulrich et al. | |
| 6,895,482 B1 * | 5/2005 | Blackmon et al. | 711/158 |
| 6,895,534 B2 | 5/2005 | Wong et al. | |
| 6,907,011 B1 | 6/2005 | Miller et al. | |
| 6,907,520 B2 * | 6/2005 | Parady | 712/228 |
| 6,917,942 B1 | 7/2005 | Burns et al. | |
| 6,920,494 B2 * | 7/2005 | Heitman et al. | 709/223 |
| 6,922,696 B1 | 7/2005 | Lincoln et al. | |
| 6,922,708 B1 | 7/2005 | Sedlar | |
| 6,934,878 B2 | 8/2005 | Massa et al. | |
| 6,940,966 B2 | 9/2005 | Lee | |
| 6,954,435 B2 | 10/2005 | Billhartz et al. | |
| 6,990,604 B2 | 1/2006 | Binger | |
| 6,990,611 B2 | 1/2006 | Busser | |
| 7,007,044 B1 | 2/2006 | Rafert et al. | |
| 7,007,097 B1 | 2/2006 | Huffman et al. | |
| 7,017,003 B2 | 3/2006 | Murotani et al. | |
| 7,043,485 B2 | 5/2006 | Manley et al. | |
| 7,043,567 B2 * | 5/2006 | Trantham | 710/6 |
| 7,069,320 B1 | 6/2006 | Chang et al. | |
| 7,103,597 B2 * | 9/2006 | McGoveran | 1/1 |
| 7,111,305 B2 | 9/2006 | Solter et al. | |
| 7,113,938 B2 * | 9/2006 | Highleyman et al. | 1/1 |
| 7,124,264 B2 | 10/2006 | Yamashita | |
| 7,146,524 B2 | 12/2006 | Patel et al. | |
| 7,152,182 B2 | 12/2006 | Ji et al. | |
| 7,177,295 B1 | 2/2007 | Sholander et al. | |
| 7,181,746 B2 * | 2/2007 | Perycz et al. | 719/310 |
| 7,184,421 B1 | 2/2007 | Liu et al. | |
| 7,194,487 B1 | 3/2007 | Kekre et al. | |
| 7,206,805 B1 * | 4/2007 | McLaughlin, Jr. | 709/203 |
| 7,225,204 B2 | 5/2007 | Manley et al. | |
| 7,228,299 B1 | 6/2007 | Harmer et al. | |
| 7,240,235 B2 | 7/2007 | Lewalski-Brechter | |
| 7,249,118 B2 | 7/2007 | Sandler et al. | |
| 7,257,257 B2 | 8/2007 | Anderson et al. | |
| 7,290,056 B1 * | 10/2007 | McLaughlin, Jr. | 709/230 |
| 7,313,614 B2 | 12/2007 | Considine et al. | |
| 7,318,134 B1 | 1/2008 | Oliverira et al. | |
| 7,346,346 B2 | 3/2008 | Fachan | |
| 7,346,720 B2 | 3/2008 | Fachan | |
| 7,370,064 B2 * | 5/2008 | Yousefi'zadeh | 1/1 |
| 7,373,426 B2 | 5/2008 | Jinmei et al. | |
| 7,386,675 B2 | 6/2008 | Fachan | |
| 7,386,697 B1 | 6/2008 | Case et al. | |
| 7,440,966 B2 | 10/2008 | Adkins et al. | |
| 7,451,341 B2 | 11/2008 | Okaki et al. | |
| 7,509,448 B2 | 3/2009 | Fachan et al. | |
| 7,509,524 B2 | 3/2009 | Patel et al. | |
| 7,533,298 B2 | 5/2009 | Smith et al. | |
| 7,546,354 B1 | 6/2009 | Fan et al. | |
| 7,546,412 B2 | 6/2009 | Ahmad et al. | |
| 7,551,572 B2 | 6/2009 | Passey et al. | |
| 7,558,910 B2 | 7/2009 | Alverson et al. | |
| 7,571,348 B2 | 8/2009 | Deguchi et al. | |

| | | |
|---|---|---|
| 7,577,258 B2 | 8/2009 | Wiseman et al. |
| 7,577,667 B2 * | 8/2009 | Hinshaw et al. .................... 1/1 |
| 7,590,652 B2 | 9/2009 | Passey et al. |
| 7,593,938 B2 | 9/2009 | Lemar et al. |
| 7,596,713 B2 | 9/2009 | Mani-Meitav et al. |
| 7,631,066 B1 | 12/2009 | Schatz et al. |
| 7,665,123 B1 | 2/2010 | Szor et al. |
| 7,676,691 B2 | 3/2010 | Fachan et al. |
| 7,680,836 B2 | 3/2010 | Anderson et al. |
| 7,680,842 B2 | 3/2010 | Anderson et al. |
| 7,685,126 B2 | 3/2010 | Patel et al. |
| 7,685,162 B2 | 3/2010 | Heider et al. |
| 7,689,597 B1 | 3/2010 | Bingham et al. |
| 7,707,193 B2 | 4/2010 | Zayas et al. |
| 7,716,262 B2 | 5/2010 | Pallapotu |
| 7,734,603 B1 | 6/2010 | McManis |
| 7,739,288 B2 | 6/2010 | Lemar et al. |
| 7,743,033 B2 | 6/2010 | Patel et al. |
| 7,752,402 B2 | 7/2010 | Fachan et al. |
| 7,756,898 B2 | 7/2010 | Passey et al. |
| 7,779,048 B2 | 8/2010 | Fachan et al. |
| 7,783,666 B1 | 8/2010 | Zhuge et al. |
| 7,788,303 B2 | 8/2010 | Mikesell et al. |
| 7,797,283 B2 | 9/2010 | Fachan et al. |
| 7,822,932 B2 | 10/2010 | Fachan et al. |
| 7,840,536 B1 | 11/2010 | Ahal et al. |
| 7,844,617 B2 | 11/2010 | Lemar et al. |
| 7,848,261 B2 | 12/2010 | Fachan |
| 7,870,345 B2 | 1/2011 | Issaquah et al. |
| 7,882,068 B2 | 2/2011 | Schack et al. |
| 7,882,071 B2 | 2/2011 | Fachan et al. |
| 7,899,800 B2 | 3/2011 | Fachan et al. |
| 7,900,015 B2 | 3/2011 | Fachan et al. |
| 7,917,474 B2 | 3/2011 | Passey et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0029200 A1 * | 3/2002 | Dulin et al. .................... 705/67 |
| 2002/0035668 A1 | 3/2002 | Nakano et al. |
| 2002/0038436 A1 | 3/2002 | Suzuki |
| 2002/0049778 A1 | 4/2002 | Bell et al. |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078161 A1 * | 6/2002 | Cheng .................... 709/208 |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0107877 A1 | 8/2002 | Whiting et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Ulrich et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0170036 A1 | 11/2002 | Cobb et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0009511 A1 | 1/2003 | Giotta et al. |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0126522 A1 | 7/2003 | English et al. |
| 2003/0131860 A1 | 7/2003 | Ashcraft et al. |
| 2003/0135514 A1 | 7/2003 | Patel et al. |
| 2003/0149750 A1 | 8/2003 | Franzenburg |
| 2003/0158873 A1 | 8/2003 | Sawdon et al. |
| 2003/0161302 A1 | 8/2003 | Zimmermann et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182312 A1 | 9/2003 | Chen et al. |
| 2003/0182325 A1 | 9/2003 | Manely et al. |
| 2003/0233385 A1 * | 12/2003 | Srinivasa et al. .................... 709/1 |
| 2004/0003053 A1 | 1/2004 | Williams |
| 2004/0024731 A1 | 2/2004 | Cabrera et al. |
| 2004/0024963 A1 | 2/2004 | Talagala et al. |
| 2004/0078680 A1 | 4/2004 | Hu et al. |
| 2004/0078812 A1 | 4/2004 | Calvert |
| 2004/0117802 A1 | 6/2004 | Green |
| 2004/0133670 A1 | 7/2004 | Kaminksky et al. |
| 2004/0143647 A1 | 7/2004 | Cherkasova |
| 2004/0153479 A1 | 8/2004 | Mikesell et al. |
| 2004/0158549 A1 * | 8/2004 | Matena et al. .................... 707/1 |
| 2004/0174798 A1 | 9/2004 | Riguidel et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0240444 A1 * | 12/2004 | Matthews et al. .................... 370/389 |
| 2004/0260673 A1 | 12/2004 | Hitz et al. |
| 2004/0267747 A1 | 12/2004 | Choi et al. |
| 2005/0010592 A1 | 1/2005 | Guthrie |
| 2005/0033778 A1 | 2/2005 | Price |
| 2005/0044197 A1 * | 2/2005 | Lai .................... 709/223 |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0125456 A1 | 6/2005 | Hara et al. |
| 2005/0131860 A1 | 6/2005 | Livshits |
| 2005/0131990 A1 | 6/2005 | Jewell |
| 2005/0138195 A1 | 6/2005 | Bono |
| 2005/0138252 A1 * | 6/2005 | Gwilt .................... 710/110 |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1 | 9/2005 | Messinger |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047713 A1 | 3/2006 | Gornshtein et al. |
| 2006/0047925 A1 | 3/2006 | Perry |
| 2006/0053263 A1 | 3/2006 | Prahlad et al. |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2006/0294589 A1 | 12/2006 | Achanta et al. |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |

| | | | |
|---|---|---|---|
| 2007/0094449 A1 | 4/2007 | Allison et al. |
| 2007/0094452 A1 | 4/2007 | Fachan |
| 2007/0124337 A1 | 5/2007 | Flam |
| 2007/0168351 A1 | 7/2007 | Fachan |
| 2007/0171919 A1 | 7/2007 | Godman et al. |
| 2007/0192254 A1 | 8/2007 | Hinkle |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0244877 A1 | 10/2007 | Kempka |
| 2007/0255765 A1 | 11/2007 | Robinson |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0059734 A1 | 3/2008 | Mizuno |
| 2008/0126365 A1 | 5/2008 | Fachan et al. |
| 2008/0151724 A1 | 6/2008 | Anderson et al. |
| 2008/0154978 A1 | 6/2008 | Lemar et al. |
| 2008/0155191 A1 | 6/2008 | Anderson et al. |
| 2008/0168304 A1 | 7/2008 | Flynn et al. |
| 2008/0168458 A1 | 7/2008 | Fachan et al. |
| 2008/0243773 A1 | 10/2008 | Patel et al. |
| 2008/0256103 A1 | 10/2008 | Fachan et al. |
| 2008/0256537 A1 | 10/2008 | Fachan et al. |
| 2008/0256545 A1 | 10/2008 | Fachan et al. |
| 2008/0294611 A1 | 11/2008 | Anglin et al. |
| 2009/0055399 A1 | 2/2009 | Lu et al. |
| 2009/0055604 A1 | 2/2009 | Lemar et al. |
| 2009/0055607 A1 | 2/2009 | Schack et al. |
| 2009/0125563 A1 | 5/2009 | Wong et al. |
| 2009/0210880 A1 | 8/2009 | Fachan et al. |
| 2009/0248756 A1 | 10/2009 | Akidau et al. |
| 2009/0248765 A1 | 10/2009 | Akidau et al. |
| 2009/0248975 A1 | 10/2009 | Daud et al. |
| 2009/0249013 A1 | 10/2009 | Daud et al. |
| 2009/0252066 A1 | 10/2009 | Passey et al. |
| 2009/0327218 A1 | 12/2009 | Passey et al. |
| 2010/0011011 A1 | 1/2010 | Lemar et al. |
| 2010/0016155 A1 | 1/2010 | Fachan |
| 2010/0122057 A1 | 5/2010 | Strumpen et al. |
| 2010/0161556 A1 | 6/2010 | Anderson et al. |
| 2010/0161557 A1 | 6/2010 | Anderson et al. |
| 2010/0185592 A1 | 7/2010 | Kryger |
| 2010/0223235 A1 | 9/2010 | Fachan |
| 2010/0235413 A1 | 9/2010 | Patel |
| 2010/0241632 A1 | 9/2010 | Lemar et al. |
| 2010/0306786 A1 | 12/2010 | Passey |
| 2011/0016353 A1 | 1/2011 | Mikesell |
| 2011/0022790 A1 | 1/2011 | Fachan |
| 2011/0035412 A1 | 2/2011 | Fachan |
| 2011/0044209 A1 | 2/2011 | Fachan |
| 2011/0060779 A1 | 3/2011 | Lemar et al. |
| 2011/0087635 A1 | 4/2011 | Fachan |
| 2011/0087928 A1 | 4/2011 | Daud et al. |

FOREIGN PATENT DOCUMENTS

| | | |
|---|---|---|
| EP | 1421520 | 5/2004 |
| EP | 1563411 | 8/2005 |
| EP | 2284735 | 2/2011 |
| EP | 2299375 | 3/2011 |
| JP | 04096841 | 3/1992 |
| JP | 2006-506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |
| WO | WO 2008/127947 | 10/2008 |

OTHER PUBLICATIONS

May 8, 2008 Int'l Search report PCT/US07/018324, 13 pages.
Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1—p. 447, last line.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96-101.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Oct. 8, 2008 European Supplemental Search Report EP 02 75 6944, 6 pages.
Jan. 23, 2009 Examination Report EP 02 75 6944, 5 pages.
May 18, 2009 Int'l Search report PCT/US08/059798, 18 pages.
Oct. 22, 2009 Int'l Preliminary Report on Patentability PCT/US08/059798, 10 pages.
Keidar,et al.: Increasing the Resilience of Distributed and Replicated Database Systems (1998) pp. 1-25.
Lougher P. et al., "Scalable storage servers for digital audio and video," International Conference on Storage and Recording Systems, 1994, Keele, UK, Jan. 1, 1994, pp. 140-143.
Reddy, P. Krishna et al., Reducing the blocking in two phase commit with backup sites Apr. 15, 2003, Elsevier, pp. 39-47.
IOS Commands, Feb. 6, 2005, Pantz.org, [online], <web.archive.org/web/20050206184604/http://pantz.org/os/ios/ioscommands.shtml>, pp. 1-12 as printed.
IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.
Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.
Yoshitake Shinkai, Cluster File System: HAMFS, Fujitsu, Japan, Fujitsu Limited, Jul. 9, 1999, vol. 50, No. 4, pp. 210 to 214 (stamped Citation 2 / English Translation attached) total 16 pages.
Nov. 15, 2002 International Search Report PCT/US02/24728.
Apr. 20, 2004 International Search Report PCT/US03/36699.
Aug. 6, 2004 International Search Report PCT/US03/33704.
Feb. 22, 2008 Int'l Search report PCT/US07/018326, 20 pages.

Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (including exhibits listed separately), 1 page.
Isilon Systems, "Isilon IQ Plateform Overview", 4 pages (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Philip A. Bernstein, Vassos Hadzilacos, and Nathan Goodman, *Concurrency Control and Recovery in Database Systems*, Addison-Wesley, 1987, pp. 1-270.
Birk, Y., *Deterministic load-balancing schemes for disk-based video-on-demand storage servers*, Mass Storage Systems 1995; Storage— At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-620.
Coulouris et al., *Distributed Systems Concepts and Design*, Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.
Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996, pp. 410-871.
Sape Mullender, editor, *Distributed Systems (2nd Ed.)*, ACM Press/ Addison-Wesley Publishing Co., New York, NY, USA, 1993, pp. 1-327.
Sape Mullender, editor, *Distributed Systems (2nd Ed.)*, ACM Press/ Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.

Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System, Symposium on Operating Systems Principles*, Oct. 19-22, 2003, 15 pages, Bolton Landing, NY.
Pei Cao et al., *The TickerTAIP parallel RAID architecture*, 1993, 12 pages, Princeton, NJ.
Pei Cao et al., *The TickerTAIP parallel RAID architecture, ACM Transactions on Computer Systems*, vol. 12, No. 3, Aug. 1994, 34 pages, Palto Alto, California.
Bob Duzett, et al., *An Overview of the nCube 3 Supercomputer*, IEEE, Jul. 1992, pp. 458-464.
John Henry Hartman, *The Zebra Striped Network File System*, 1994, pp. 1-148, University of California at Berkeley.
Darrell D.E. Long et al., *Swift/RAID: A Distributed RAID System*, Computing Systems, vol. 7, No. 3 Summer 1994, pp. 333-359.
Michael Stonebraker et al., *Distributed RAID: A new Multiple copy Algorithm*, IEEE 1990, pp. 430-437, Berkeley, California.
United States Court of Appeals, Federal Circuit, *Seachange International, Inc.* Vs. *nCUBE, Corp.*, Oct. 26, 2004, 28 pages.
United States Court of Appeals, Federal Circuit, *Seachange International, Inc.* Vs. *C-Cor, Inc.*, Jun. 29, 2005, 22 pages.
United States District Court, Delaware, *Seachange International, Inc.* Vs. *nCUBE, Corp.*, Apr. 7, 2004, 13 pages.
United States District Court, Delaware, *Seachange International, Inc.* Vs. *nCUBE, Corp.*, Aug. 29, 2000, 12 pages.
European Search Report dated May 21, 2007 issued to EP application No. 02756944.1-2201.
Stallings, William, "Operating Systems," Prentice Hall, Fourth Edition, 2001, pp. 197-253 and 265-293.
Duchamp, Dan: "Analysis of Transaction Management Performance", ACM Symposium on Operating Systems Principles, Dec. 1989, pp. 177-190.
Silaghi, Raul et al.: "Porting OMTTs to CORBA", Lecture Notes in Computer Science, vol. 2888/2003, Nov. 2003, pp. 1521-1542.
Dorai et al.:, "Transport Threads: Resource Sharing in SMT Processor for High Single-Thread Performance", proceedings of the 2002 International Conference on Parallel Architectures and Complication Techniques, Sep. 2002, 12 pages.
Peterson, Zachary Nathaniel Joseph, "Data Placement For Copy-On-Write Using Virtual Contiguity," Master of Science in Computer Science Thesis, University of California, Santa Cruz, Sep. 2002, 67 pages.
Jim Gray and Andreas Reuter, Transaction Processing: Concepts and Techniques, Morgan Kaufmann, 1993, pp. 1-290.
Jim Gray and Andreas Reuter, Transaction Processing: Concepts and Techniques, Morgan Kaufmann, 1993, pp. 291-628.
Jim Gray and Andreas Reuter, Transaction Processing: Concepts and Techniques, Morgan Kaufmann, 1993, pp. 630-1070.
Sape Mullender, editor, Distributed Systems (2nd Ed.), ACM Press/ Addison-Wesley Publishing Co., New York, NY, USA, 1993, pp. 1-315.
Sape Mullender, editor, Distributed Systems (2nd Ed.), ACM Press/ Addison-Wesley Publishing Co., New York, NY, USA, 1993, pp. 316-595.
Gerhard Weikum, et al., Transactional Information Systems: Theory, Algorithms, and the Practice of Concurrency Control and Recovery, Morgan Kaufmann, 2002, pp. 1-435.
Gerhard Weikum, et al., Transactional Information Systems: Theory, Algorithms, and the Practice of Concurrency Control and Recovery, Morgan Kaufmann, 2002, pp. 436-853.

* cited by examiner

DISTRIBUTED SYSTEM WITH ASYNCHRONOUS EXECUTION SYSTEMS AND METHODS

REFERENCE TO RELATED APPLICATIONS

The present application claims priority benefit under 35 U.S.C. §119(e) from U.S. Provisional Application No. 60/623,846, filed Oct. 29, 2004 entitled "Distributed System with Asynchronous Execution Systems and Methods," and U.S. Provisional Application No. 60/628,527, filed Nov. 15, 2004 entitled "Distributed System with Asynchronous Execution Systems and Methods." The present application hereby incorporates by reference herein both of the foregoing applications in their entirety.

The present application relates to U.S. application Ser. No. 11/262,306, titled "Non-Blocking Commit Protocol Systems and Methods," filed on even date herewith, which claims priority to U.S. Provisional Application No. 60/623,843, filed Oct. 29, 2004 entitled "Non-Blocking Commit Protocol Systems and Method;" and U.S. application Ser. No. 11/262,314, titled "Message Batching with Checkpoints Systems and Methods", filed on even date herewith, which claims priority to U.S. Provisional Application No. 60/623,848, filed Oct. 29, 2004 entitled "Message Batching with Checkpoints Systems and Methods," and U.S. Provisional Application No. 60/628,528, filed Nov. 15, 2004 entitled "Message Batching with Checkpoints Systems and Methods." The present application hereby incorporates by reference herein all of the foregoing applications in their entirety.

BACKGROUND

1. Field of the Invention

This invention relates to systems and methods for executing commands in distributed systems.

2. Description of the Related Art

In a distributed system, operations are performed by a plurality of network nodes. Typical transactions include a series of commands that are executed sequentially by the distributed system. For example, FIG. 1 illustrates a flowchart of a transaction 100 comprising a plurality of commands executed on a computer network (not shown) having a local node that initiates the transaction 100 and one or more remote nodes that participate in the transaction 100. The elapsed time from a start 106 of the transaction 100 to an end 108 of the transaction 100 is affected by factors such as waiting for network resources to become available, waiting for commands to execute, waiting to receive responses to sent messages, or the like.

After starting 106 the transaction 100, the computer network executes a first command 110 (shown as "CMD_A"). The first command 110 may be executed on the local node, sent to one or more remote nodes, or both. The computer network may wait for the first command 110 to be completed before continuing with the transaction 100. If, for example, the first command 110 is sent to one or more remote nodes for execution thereon, the local node will wait until it receives a response from each of the remote nodes.

Once the first command 110 is complete, the computer network executes a second command 120 (shown as "CMD_B"). The computer network waits for the second command 120 to be completed before executing a third command 130 (shown as "CMD_C"). Again, the computer network waits for the third command 130 to be completed before executing a fourth command 140 (shown as "CMD_D"). Once the fourth command 140 is completed, the transaction 100 ends 108.

System resources, such as the availability of central processing units to execute the commands 110, 120, 130, 140 or bandwidth to send messages across the computer network, may be underutilized as the computer network waits for each command 110, 120, 130, 140 to execute in turn. For example, one or more of the nodes may be idle or may have extra processing capabilities available that are not used while the computer network waits for other nodes to complete their tasks. This occurs even if the underutilized system resources have sufficient data available to them to perform subsequent operations. For example, if all of the data and resources necessary to execute both the first command 110 and the third command 130 is available at the start 106 of the transaction 100, waiting for the first command 110 and the second command 120 to be completed before executing the third command 130 adds unnecessary delay to overall transaction 100.

SUMMARY

Thus, it is advantageous to use techniques and systems for reducing latency in distributed systems by executing commands as sufficient information and system resources become available. In one embodiment, commands in a transaction include dependency information and an execution engine is configured to execute the commands as the dependencies become satisfied. In addition, or in other embodiments, the commands also include priority information. If sufficient resources are not available to execute two or more commands with satisfied dependencies, the execution engine determines an order for executing the commands based at least in part on the priority information. In one embodiment, time-intensive commands are assigned a higher priority than commands that are expected to take less time to execute.

In one embodiment, a method is provided for performing a transaction in a distributed system. The method may include providing a first command and a second command that define functions to be performed in the transaction, wherein the first command further defines a dependency; holding the first command in a waiting state until the dependency is satisfied; prioritizing the first command and second command; and executing the first command and the second command in an order based at least in part on the prioritization.

In an additional embodiment, a distributed system is provided. The distributed system may include a plurality of nodes configured to participate in a transaction through a computer network, wherein the transaction comprises commands with dependencies; a layout manager module configured to determine in which one of the plurality of nodes to write blocks of data; and an execution manager module configured to process the commands based at least in part on the dependencies.

In another embodiment, a method is provided for processing commands in a distributed system. The method may include defining dependencies for a plurality of commands; setting the plurality of commands in a waiting state; as dependencies are satisfied for particular commands, setting the particular commands in a runnable state; and executing the particular commands in the runnable state as system resources become available.

In a further embodiment, a network is provided. The network may include a plurality of nodes configured to participate in a transaction over the network, wherein the transaction comprises a plurality of commands, wherein at least one of the commands comprises dependency information, and wherein the network executes the at least one command when the dependency information is satisfied For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Systems and methods that embody the various features of the invention will now be described with reference to the following drawings, in which.

DETAILED DESCRIPTION OF PREFERRED EMBODIMENTS

Rather than executing commands sequentially, an execution engine, according to one embodiment, processes commands asynchronously as sufficient information and system resources become available. The commands include dependency information that defines relationships among the commands. For example, a first command may include dependency information that specifies that the execution engine is to hold the first command in a waiting state until determining that one or more nodes in a distributed system have successfully executed a second command. Once the dependency is satisfied, the execution engine moves the first command to a runnable state where it can be executed by the nodes as system resources become available.

In a transaction with a plurality of commands executed by nodes in a distributed system, the execution engine increases overlapping use of system resources by moving the commands from the waiting state to the runnable state as dependencies are satisfied. Thus, the nodes can execute multiple commands with satisfied dependencies at the same time. In other words, the nodes do not have to wait to execute commands with satisfied dependencies while other commands are executed by other nodes. This reduces latency and increases the overall speed of the transaction.

In addition, or in other embodiments, the commands also include priority information. If sufficient resources are not available to execute two or more commands with satisfied dependencies, the execution engine determines an order for executing the commands based at least in part on the priority information. In one embodiment, time-intensive commands are assigned a higher priority than commands that are expected to take less time to execute.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present disclosure. The present disclosure, however, may be practiced without the specific details or with certain alternative equivalent components and methods to those described herein. In other instances, well-known components and methods have not been described in detail so as not to unnecessarily obscure aspects of the present disclosure.

I. Command Data Structure

Figure 1:
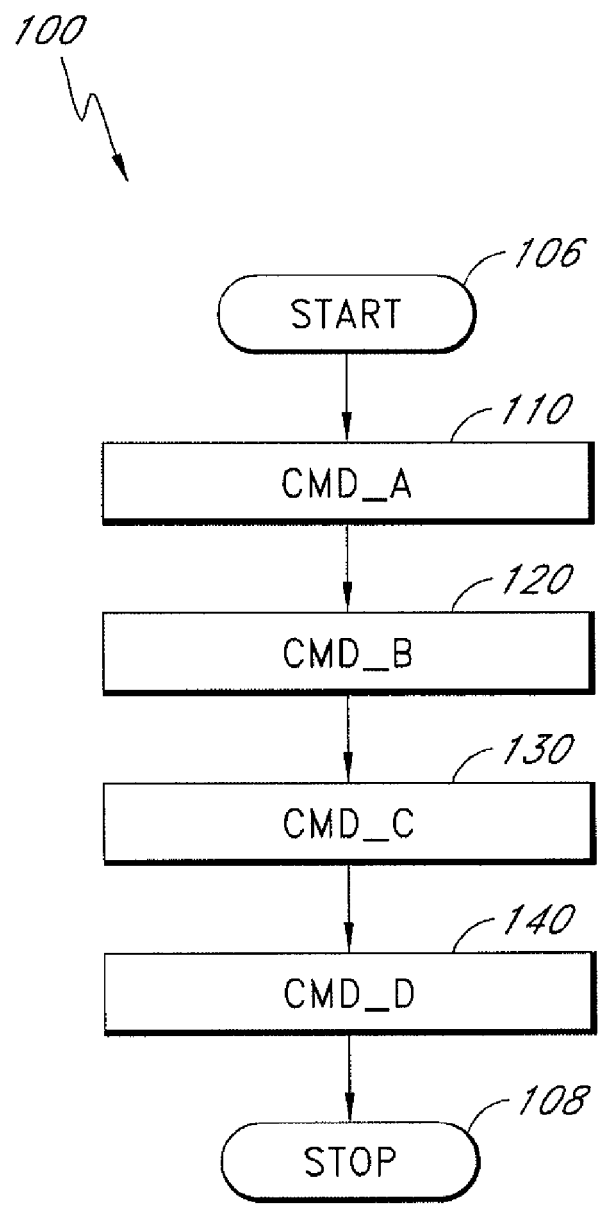
FIG. 1 is a flowchart illustrating a transaction comprising a plurality of commands executed sequentially on a computer network.
Figure 2:
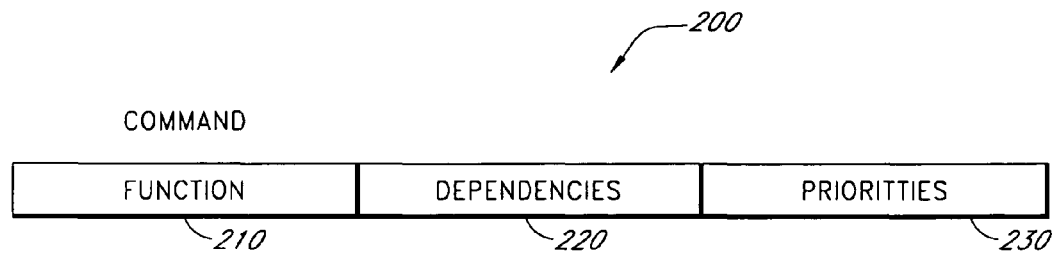
FIG. 2 illustrates one embodiment of a command data structure.

FIG. 2 illustrates one embodiment of a command data structure 200. The command data structure 200 comprises a function field 210, a dependency field 220, and a priority field 230. The function field 210 defines a procedure, an action, or instructions to be executed by a node in a computer network. For example, the function field 210 may instruct the node to allocate space in a memory device, write data to a specified memory location, read data from a specified memory location, generate parity data, or the like.

The dependency field 220 specifies conditions (also referred to herein as "waiters") for executing the action defined by the function field 210. For example, the dependency field 220 may specify that certain data should be available before the action defined by the function field 210 is executed. As another example, the dependency field 220 may specify that a node in a distributed system execute one or more other commands to completion before executing the action defined by the function field 210. In other embodiments, the dependency field 220 may store a count of commands (for example, wait count) upon which the command should wait upon as well as a list of other commands that are awaiting completion of this command. As discussed in detail below, an execution engine is configured to move the command 200 from a waiting state to a runnable state as the waiters specified in the dependency field 220 are satisfied. Once in the runnable state, one or more nodes in the distributed system can execute the action defined by the function field 210.

The dependency field 230 specifies the order in which the action defined by the function field 210 is executed in relation to other commands in a transaction. For example, if sufficient nodes, processors within a node, network connections, or other system resources are not available to execute two or more commands with satisfied dependencies, the execution engine determines the order of execution first based at least in part on information in the dependency field 230.

In one embodiment, the priority field 230 comprises a high priority flag, a medium priority flag, and a low priority flag. Commands having high priority are executed before commands having medium or low priority. Similarly, commands having medium priority are executed before commands having low priority. Commands with the same priority level are executed in the order in which their dependencies are satisfied. If multiple commands with the same priority level are ready to be executed at the same time, the execution engine may use one or more common techniques to select the ordering of the commands (for example, round robin, selection, first in first out selection, random selection, and the like). In some embodiments, each command is associated with one priority, but in other embodiments, each command may be associated with more than one priority and/o may have subpriorities. An artisan will recognize from the disclosure herein that priorities can be specified in other ways including, for example, specifying only two levels of priority more than three levels of priority and/or sublevels of priority within one or more levels of priority. Priorities can also be specified dynamically during execution of a transaction by setting conditions in the priority field 230. For example, the priority level may depend at least in part on a result such as a pass or failure obtained by executing another command.

In one embodiment, commands expected to take longer to execute than other commands are given a higher priority. Thus, as resources become available, the nodes can execute the lower priority commands while continuing to execute the higher priority commands. This overlap in using system resource reduces latency as commands are executed in parallel.

In addition, or in other embodiments, commands sent from a local node to one or more remote nodes in a network are assigned a higher priority than commands that are executed locally and do not utilize the network. The local node sends higher priority commands to the remote nodes before executing lower priority commands. As the remote nodes execute higher priority commands, the local node can then execute lower priority commands at the same time. This increases utilization of system resources and reduces latency because the remote nodes do not have to wait for the local node to execute the lower priority commands and the local node does not have to wait for the remote nodes to execute the higher priority commands.

A set of sample priorities is described below. It is recognized, however, that a variety of priority levels, and sublevels, may be used and that priorities may be assigned in a variety of ways.

HIGH: Reads which may come from a high latency device. (for example, disk); allocation, upon which many commands may depend.

MED: Any command involving a remote node; can be used for everything except parity generation and block reconstruction.

LOW: Parity generation, reconstruction.

Including the function field 210, the dependency field 220, and the priority field 230 within the command data structure 200 also allows a distributed system to perform a transaction asynchronously. For example, a local node can send commands to a remote node that determines when and in what order to execute the commands without waiting for further messages from the local node. The remote node makes these determinations based on the information in the dependency field 220 and the priority field 230. Pushing control of command ordering from local nodes to remote nodes reduces the number of messages sent across the network, which further reduces latency.

In other embodiments, the dependencies 220 and the priorities 230 may be stored apart from the function, such as, in a look-up table, a database, or the like. For example, one or more functions may be pre-assigned dependencies 220 and priorities 230 such that once the command 200 is received, the node can look up the corresponding dependencies 220 and/or priorities 230 in the look-up table, database or the like.

II. Exemplary Dependency Graph

Figure 3:
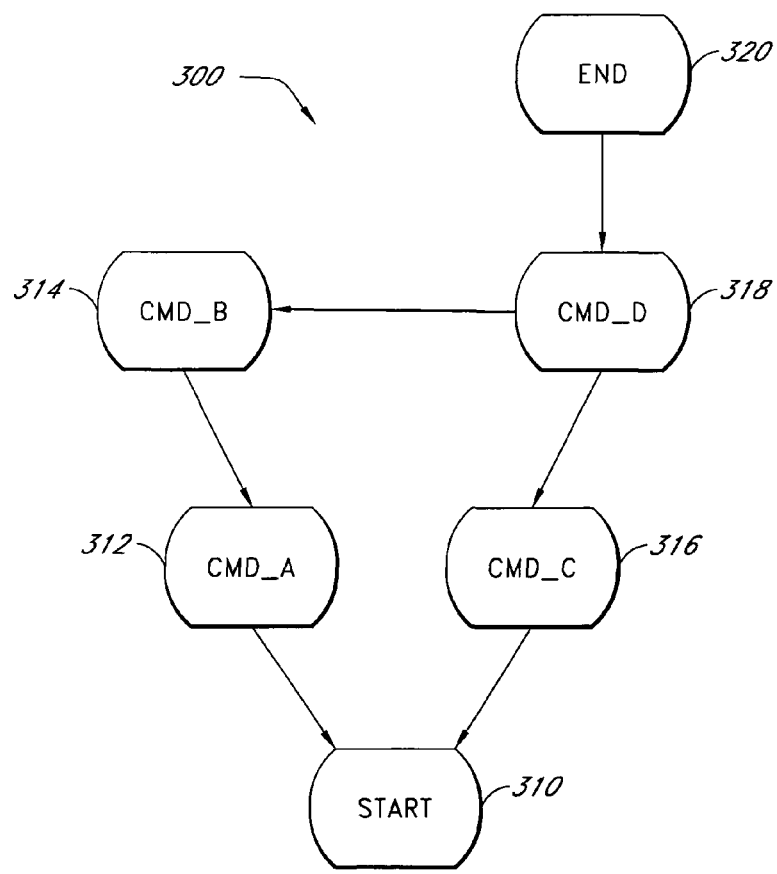
FIG. 3 is an exemplary dependency graph according to one embodiment illustrating relationships between a plurality of commands in a transaction executed on a computer system.

Dependency graphs are one example way to illustrate relationships between commands in a transaction. FIG. 3 is an exemplary dependency graph according to one embodiment illustrating relationships between a plurality of commands in a transaction 300 executed on a computer system. The transaction 300 comprises a start command 310 defining the beginning of the transaction 300, a first command 312 (shown as "CMD_A"), a second command 314 (shown as "CMD_B"), a third command 316 (shown as "CMD_C"), a fourth command 318 (shown as "CMD_D") and an end command 320 defining the end of the transaction 300. The commands 312, 314, 316, 318 can be executed, for example, on a local node of a distributed system, on a remote node of the network, or both.

The exemplary dependency graphs have lines between commands to indicate that the execution of one command cannot begin until all commands to which it points have completed. For example, the first command 312 and the third command 316 each point to the start command 310 to indicate that the start command 310 executes before the first command 312 and the third command 316 execute, that is, that the first command and the third command depend on the execution of the start command. As shown, the first command 312 executes to completion before the second command 314 executes. Further, both the second command 314 and the third command 316 execute to completion before the fourth command 318 executes. After the fourth command 318 executes, the end command 320 executes.

Since the third command 316 does not depend on the first command 312 or the second command 314, the system can execute the third command 316 any time system resources are available after executing the start command 310. This may occur, for example, when all of the data necessary to execute the third command 316 is available after the system calls the start command 310. When sufficient resources are available, the system may execute the third command 316 in parallel with the first command 312, the second command 314, or both. Parallel execution increases utilization of system resources and decreases latency.

When sufficient resources are not available, execution order in one embodiment is determined by defining priorities for the commands 312, 314, 316, 318. For example, if system resources are not available to execute the first command 312 and the third command 316 at the same time, the system will execute the command with the highest priority first. If, for example, the first command 312 has a medium priority and the third command 316 has a high priority, then the system will execute the third command 316 before executing the first command 312.

In one embodiment, priorities are based at least in part on increasing local and remote resource overlap in the system. For example, the third command 316 may be given a higher priority than the first command 312 if a local node is configured to send the third command to a remote node for execution while the local node executes the first command 312.

Thus, while the local node may not have sufficient resource to execute the first command 312 and the third command 316 at the same time, sending the third command 316 to the remote node before executing the first command 312 allows the commands to be executed in parallel. In addition, or in other embodiments, higher priorities are given to commands that take longer to execute. Starting longer commands before shorter commands allows the shorter commands to execute as system resources become available while the longer commands continue to execute, thereby increasing parallel usage of system resources.

III. Node Operation

Figure 4:
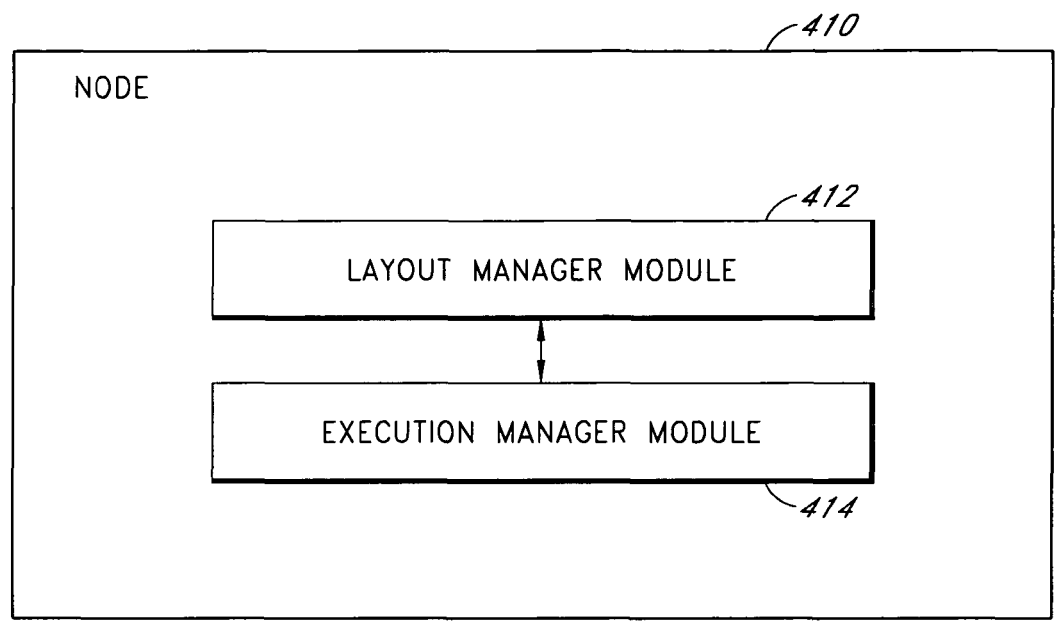
FIG. 4 is a high-level block diagram according to one embodiment of an exemplary node.

FIG. 4 illustrates a high-level block diagram of an exemplary node 410 in a distributed system according to an embodiment of the invention. The node 410 comprises a computer system capable of communicating with other nodes in the distributed system. Thus, the node 410 may comprise, for example, a storage device, a smart storage unit, a computer workstation, a memory device, a LAN, a kiosk, a point-of-sale device, a personal digital assistant, an interactive wireless communication device, an interactive television, a transponder, or the like.

The node 410 comprises a layout manager module 412 and an execution manager module 414. As used herein, the word module is a broad term having its ordinary and customary meaning and can also refer to logic embodied in hardware or firmware, or to a collection of software instructions (i.e., a "software module"), possibly having entry and exit points, written in a programming language, such as, for example, C or C++. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

A. Layout Manager Module

The layout manager module 412 is configured to determine where information is located in the distributed system and where processes will be performed for a particular transaction. As described in detail below, in some embodiments the node 410 comprises a smart storage unit in a distributed file system and the layout manager module 412 is configured to determine a layout when writing or restriping blocks of data in the distributed file system. For example, the layout manager module 412 may be configured to determine a new file layout during a restriping process when one or more storage units are added to or removed from the distributed file system such that data may be added to the new storage units or redistributed to other storage units.

In addition, the layout manager module 412 may be configured to determine a new file layout during a restriping process used when the protection scheme of a file is changed. For example, if a file goes from 3+1 parity protection to 4+1 parity protection, the layout manager module 412 determines a new file layout so data can be moved to storage units in the new layout in a manner that meets the new parity protection. In one embodiment, the layout manager module 412 continues to manage the old layout until the new layout is complete to allow users access to the file under the old layout such that the data is protected by the old parity scheme until the new parity scheme is available. In one embodiment, when repairing data, the number of protection groups for a single transaction may be calculated by using the least common-multiple of the old protection group's parity group size "n" and the new protection group's parity group size "n" such that no individual blocks are covered by two different parity protection blocks.

B. Execution Manager Module

The exemplary execution manager module 414 is configured to process the set of commands in the transaction. The execution manager module 414 processes the commands as their dependencies become satisfied and as system resources become available. In some embodiments, the execution manager module 414 processes the commands according to predetermined priorities. The execution manager module 414 allows nodes in the distributed system to execute commands with higher priorities before executing commands with lower priorities as system resources become available.

The execution manager module 414 is also referred to herein as an "execution engine" or "engine." Exemplary pseudocode according to one embodiment of the invention for executing the engine can be found in the attached Appendix which forms a part of the patent application. It should be recognized, however, that the exemplary pseudocode is not meant to limit the scope of the invention.

Figure 5:
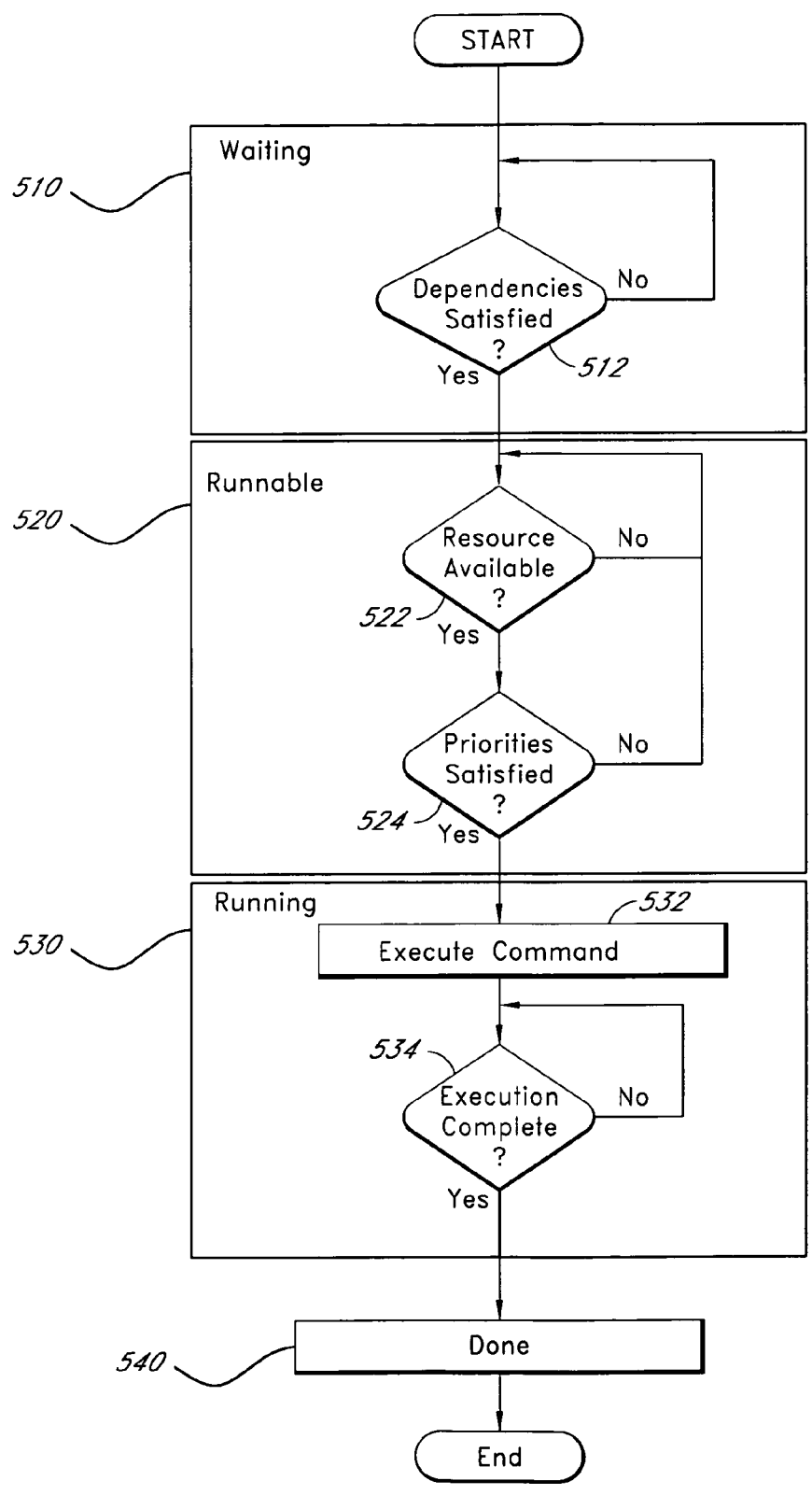
FIG. 5 a flow chart of an example lifecycle of commands according to one embodiment.

FIG. 5 is a flow chart of a lifecycle of commands 500 in one embodiment of the invention usable by the execution manager module 414 to process commands in a transaction according to one embodiment of the invention. Commands in the transaction are processed in a waiting state 510, a runnable state 520, a running state 530, and a done state 540.

The execution manager module 414 initially places a command in the waiting state 510. In a block 512, the execution manager module 414 queries whether the command's dependencies are satisfied. As discussed above, the dependencies may include, for example, a specification that one or more other commands in the transaction execute to completion or return a specified result. As another example, the dependencies may include a specification that one or more other commands in the transaction start executing. If the dependencies are not satisfied, the command remains in the waiting state 510. In other embodiments, the dependencies include a count of commands (for example, wait count) upon which the command wait. As those commands complete execution, the command's wait count is decremented. Once the command's wait count reaches zero, then the command proceeds to the runnable state, or in other embodiments to the running state. In addition, the command may include a list of other commands that are awaiting completion of the command. Once the command has completed execution, a message is sent to the other commands indicating that the command has completed execution, such that the wait counts of the other commands can be decremented.

When the dependencies are satisfied, the execution manager module 414 places the command in the runnable state 520. In a block 522, the execution manager module 414 queries whether system resources are available to execute the command. For example, the execution manager module 414 may determine that a processor on a local node is currently executing another command in the transaction and is unavailable to execute the command. Further, the execution manager module 414 may determine that a network connection is unavailable to send the command to a remote node in the network or that the remote node is unavailable to execute the command.

Once system resources become available to execute the command, the execution manager module 414 queries in a block 524 whether the command's priorities have been satisfied. For example, the execution manager module 414 determines whether other transaction commands in the runnable state 520 that also use the available system resources have a higher priority than the command. If the command has the highest priority, or if the command has been in the runnable state 520 longer than other transaction commands with the same priority, the execution manager module 414 determines that the command's priorities are satisfied.

In one embodiment, the command's priorities are based on factors such as the system resources used by the command, the amount of time expected to execute the command as compared to other transaction commands, whether the command is to be executed by a local node or a remote node, a user's or programmer's preference, combinations of the forgoing, or the like. In one embodiment, priority rules specify that a user, a programmer, the execution manager module 414, or a combination of the forgoing assign a high level of priority to commands executed on remote nodes and commands expected to execute slower than other transaction commands. As noted above, the execution manager module 414 may select among commands with the same priority by sharing standard selection techniques such as, for example, round robin, first in first out, random, and the like.

When the system resources are available and the priorities are satisfied, the execution manager module 414 places the command in the running state 530. In a block 532, the system resources such as one or more nodes in the distributed system execute the command. In a block 534, the execution manager module 414 queries whether system resources have completed execution of the command. Depending on the procedure called by the command, a local node executes the procedure, sends the procedure to a remote node to be executed, or both. For example, the procedure may call for space to be allocated for writing data in a remote node. The local node sends the command comprising the procedure call, dependency information and priority information to the remote node where the procedure call is executed.

For some commands, the remote node sends a response back to the local node when the procedure call has been completed. Other commands are sent asynchronously wherein the remote node does not send a response back to the execution manager module 414 when the procedure call has been completed. For asynchronous commands, the execution manager module 414 determines that the command is complete after the command has been sent to the remote node or once a predetermined amount of time elapses after the message has been sent to the remote node.

Once the execution manager module 414 determines that the command has been executed to completion, the execution manager module 414 places the command in the done state 540. Once the commands in the transaction reach the done state 540, the process 500 ends. By moving the transaction commands through the waiting state 510, the runnable state 520, the running state 530, and the done state 540 as dependencies and priorities are satisfied, the execution manager module 414 increases the overlapping of system resource usage and reduces latency.

IV. Distributed File System Example

In one embodiment, an execution engine is used in a distributed file system as described in U.S. patent application Ser. No. 10/007,003, filed Nov. 9, 2001 and issued as U.S. Pat. No. 7,685,126 on Mar. 23, 2010, which claims priority to Application No. 60/309,803 filed Aug. 3, 2001, and U.S. patent application Ser. No. 10/714,326, filed Nov. 14, 2003, which claims priority to Application No. 60/426,464, filed Nov. 14, 2002, all of which are hereby incorporated herein by reference herein in their entirety. For example, the execution engine may be used in an intelligent distributed file system that enables the storing of file data among a set of smart storage units which are accessed as a single file system and utilizes a metadata data structure to track and manage detailed information about each file, including, for example, the device and block locations of the file's data blocks, to permit different levels of replication and/or redundancy within a single file system, to facilitate the change of redundancy parameters, to provide high-level protection for metadata and to replicate and move data in real-time. In addition, the execution engine may be configured to write data blocks or restripe files distributed among a set of smart storage units in the distributed file system wherein data is protected and recoverable even if a system failure occurs during the restriping process.

High-level exemplary transactions are provided below including a write transaction, a mirror transaction, mirror recovery transaction, a parity write transaction, and a restripe transaction. An artisan will recognize from the disclosure herein that many other transactions are possible. The attached Appendix, which forms a part of the patent application, provides a list of exemplary commands and pseudocode according to one embodiment of the invention. It should be recognized, however, that the exemplary commands and pseudocode are not meant to limit the scope of the invention.

A. Write Transaction

Figure 6:
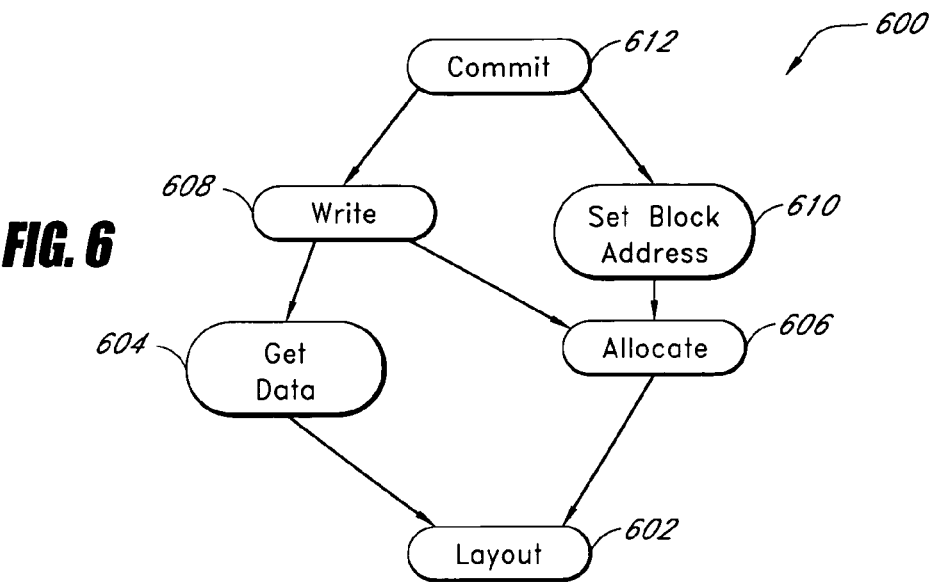
FIG. 6 is a dependency graph illustrating one embodiment of a write transaction wherein a data block is stored in a distributed file system.

FIG. 6 is a dependency graph illustrating one embodiment of a write transaction 600 wherein a data block is stored in a distributed file system. In this example, the write transaction 600 writes a data block as part of a larger transaction wherein stripes comprising a set of data blocks are distributed among a plurality of nodes in the distributed file system. The write transaction 600 begins with a layout procedure 602 that determines a particular node where a specified data block will be written.

The write transaction 600 includes a get data command 604, an allocate command 606, a write command 608 and a set block address command 610. The get data command 604 creates a temporary buffer and stores the specified data block therein. The allocate command 606 allocates space for the specified data block in memory location in the node determined by the layout procedure 602. Since the layout procedure determines the specified data block that will be stored in the node, the get data command 604 and the allocate command 606 depend on the layout procedure 602 and will not execute until the layout procedure 602 completes execution.

In other embodiments, the layout command may be a start command and the determination of where to store data may be done in conjunction with other commands such as the allocate command. In some embodiments, the layout command or the allocate command determine the specific address memory location in which to store the data. In other embodiments, the specific address memory location is determined in real time by the node. The write command 608 depends on both the get data command 604 and the allocate command 606. Once the system executes the get data command 604 and the allocate command, the node specified by the layout procedure 602 executes the write command 608 which writes the specified data block stored in the temporary buffer to the allocated memory location. The set block address command 610 depends on the allocate command 606. Once the system executes the allocate command 606, the set block address command 610 stores an address corresponding to the allocated memory location in a metadata data structure or an inode describing the file that corresponds to the specified data block. Once the system executes the write command 608 and the set block address command 610, the write transaction 600 ends with a commit protocol 612 wherein participating nodes agree on the write transaction's 600 final outcome by either committing or aborting the write transaction 600. It is recognized that the set block address command 610 may be different depending on the allocations. For example, there could be one set block address command 610 corresponding to each allocation, one set block address command 610 for data and one for error correction data, and a different set block address command 610 for different nodes. In addition, if different nodes respond to transaction starts at different times, the set block address commands 610 may be used for different commands for different destinations.

By increasing use of system resources, the write transaction 600 reduces the amount of time required to store the data block in the distributed file system. Rather than executing the commands 604, 606, 608, 610 serially, the distributed file system executes the commands 604, 606, 608, 610 as system resources and usable data becomes available. For example, when system resources are available, the system executes the get data command 604 and the allocate command 606 in parallel. By executing commands with satisfied dependencies while other commands are also executing, the system decreases latency.

When sufficient system resources are not available, the system executes the commands according to predetermined priorities. If, for example, the get data command 604 takes longer to execute than the allocate command 606, the get data command 604 may be assigned a higher priority than the allocate 606 such that the system starts the get data command 604 before the allocate command 606. Then, as system resources become available, the system executes the allocate command 606. Depending on when system resources become available in relation to starting the get data command 604, the allocate command 606 may end before the get data command 604, which would also allow the system to execute the set block address command 610 in parallel with the get data command 604 and/or the write command 608. Thus, assigning relative priorities to the commands 604, 606, 608, 610 increases resource usage and decreases latency.

B. Mirror Transaction

Figure 7:
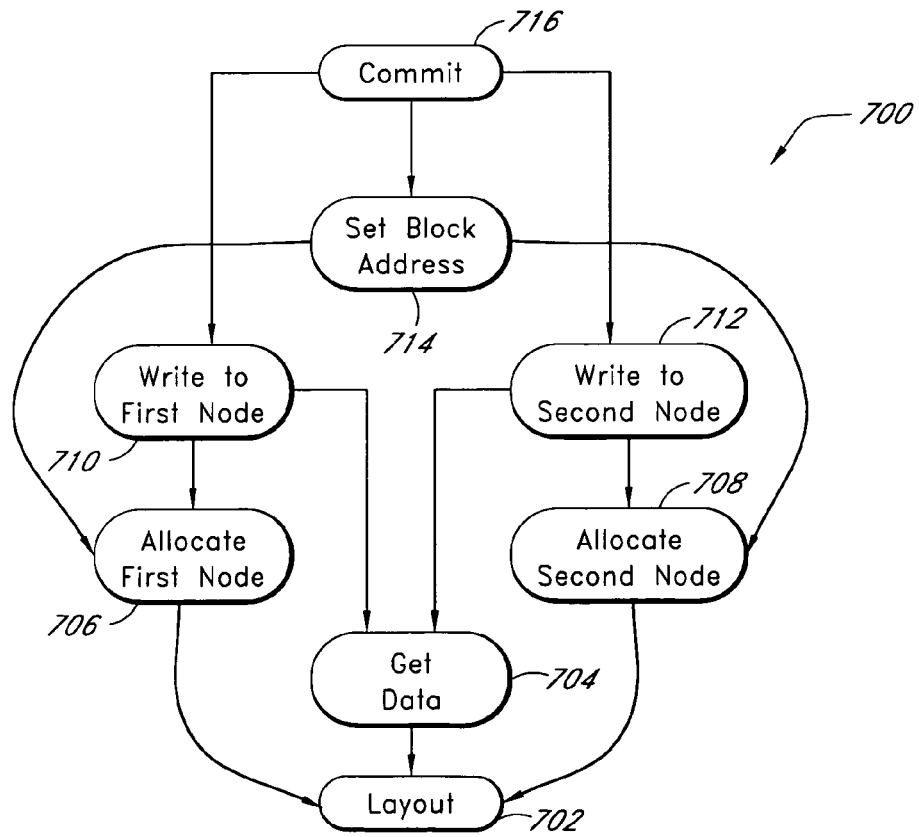
FIG. 7 is a dependency graph illustrating one embodiment of a mirror transaction in a distributed file system.

FIG. 7 is a dependency graph illustrating one embodiment of a mirror transaction 700 in a distributed file system. Data mirroring is a protection scheme that protects against device failure by storing copies of a file or a data block on different nodes in a network. In the exemplary embodiment shown in FIG. 7, a data block is written to a first node and a second node in the distributed file system. If the first node fails, for example, the data block can be retrieved from the second node.

The mirror transaction 700 begins with a layout procedure 702 that specifies a particular data block and determines the first node and the second node where copies of the specified data block will be written. The mirror transaction 700 includes a get data command 704, an allocate first node command 706, an allocate second node command 708, a write to first node command 710, a write to second node command 712 and a set block address command 714.

The get data command 704, the allocate first node command 706 and the allocate second node command 708 depend on information provided by the layout procedure 702 such as the identity of the specified data block and the identities of the first node and the second node. The get data command 704 creates a temporary buffer and stores the specified data block therein. The allocate first node command 706 allocates space in the first node for the specified data block. The allocate second node command 708 allocates space in the second node for the specified data block.

The write to first node command 710 writes the data block stored by the get data command 704 to a memory location in the first node allocated by the allocate first node command 706. Thus, the write to first node command 710 depends on information from the get data command 704 and the allocate first node command 706. Similarly, the write to second node command 712 writes the data block stored by the get data command 704 to a memory location in the second node allocated by the allocate second node command 708. Thus, the write to second node command 712 depends on information from the get data command 704 and the allocate second node command 708. Because the same data is being stored on two nodes, only one get data command is needed.

The set block address command 714 stores an address corresponding to the memory location in the first node and an address corresponding to the memory location in the second node to an inode describing a file corresponding to the data block. Thus, the set block address command 714 depends on information from the allocate first node command 706 and the allocate second node command 708.

After the system executes the write to first node command 710, the write to second node command 712, and the set block address command 714, the mirror transaction 700 ends with a commit protocol 716. In the commit protocol 716, the first node and the second node agree to commit to the mirror transaction 700 or to abort the mirror transaction 700 to maintain atomicity.

The mirror transaction 700 increases system resource usage and decreases latency by executing commands in parallel. For example, the system can execute the get data command 704, the allocate first node command 706, and the allocate second node command 708 in parallel when sufficient system resources are available. Similarly, the system can execute the write to first node command 710, the write to second node command 712 in parallel. An artisan will recognize that the system may also execute other commands in parallel including, for example, executing the set block address command 714 in parallel with the write to first node command 710, the write to second node command 712, or both. Thus, the amount of time required to write a mirrored data block in a distributed file system is reduced.

C. Mirror Recovery Transaction

Figure 8:
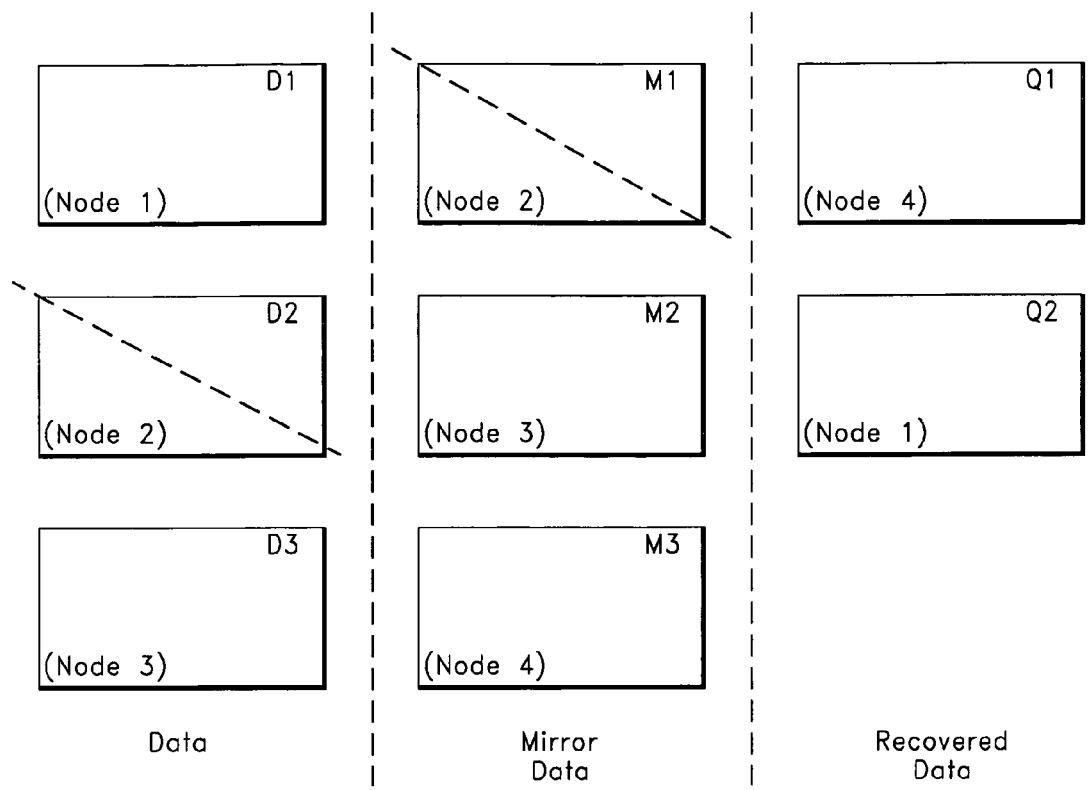
FIG. 8 is an exemplary block diagram according to one embodiment representing recovery of lost data blocks using a mirrored protection scheme in a distributed file system.
Figure 9:
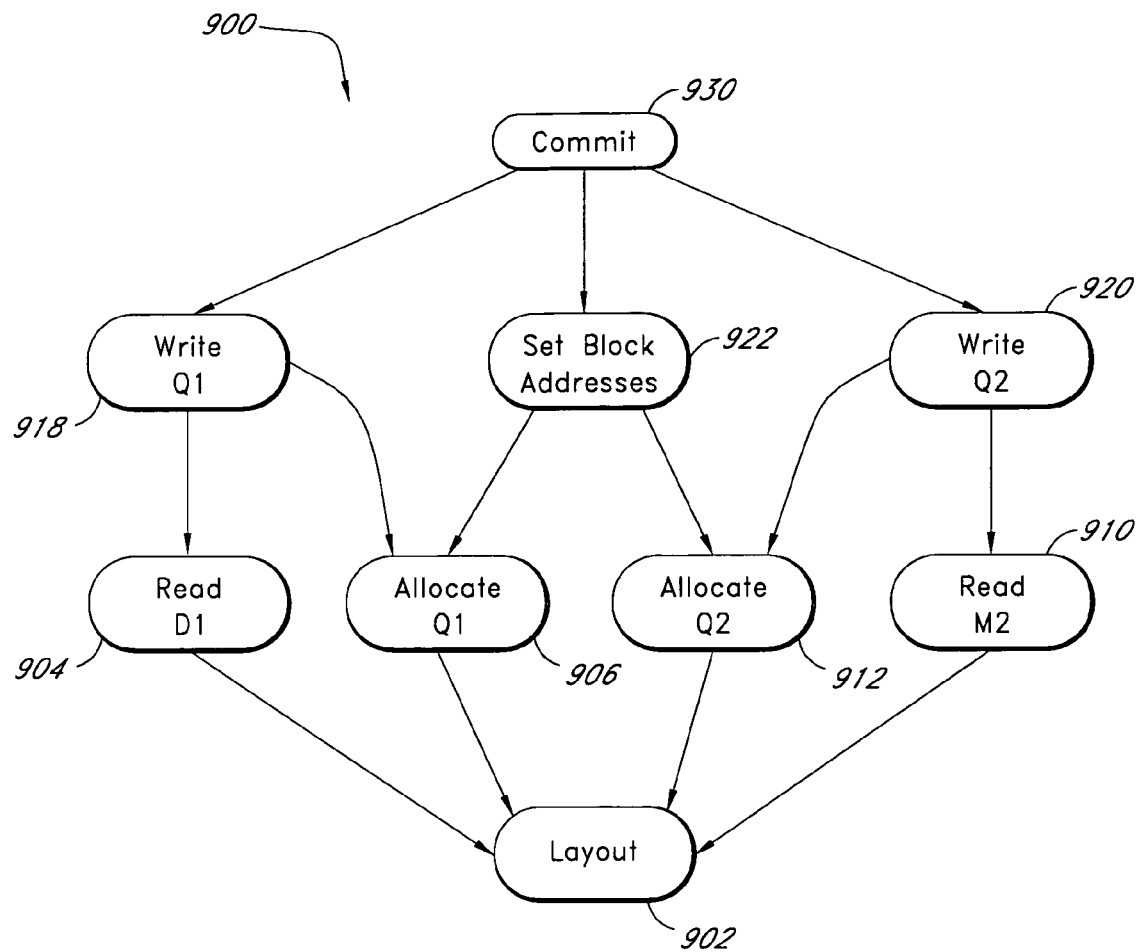
FIG. 9 is a dependency graph illustrating one embodiment of a mirror recovery transaction as described in FIG. 8.

FIGS. 8 and 9 illustrate one embodiment of recovering mirrored data when a node fails in a distributed file system. Recovering data may include, for example, using error correction to reconstruct lost data, generating error correction data to reprotect lost data, and/or generating error correction data to protect data using a different error correction scheme. FIG. 8 is a block diagram according to one embodiment representing recovery of lost data blocks using a mirrored protection scheme in a distributed file system. A first data block D1 is stored on a first node (i.e., "Node 1"), a second data block D2 is stored on a second node (i.e., "Node 2"), and a third data block D3 is stored on a third node (i.e., "Node 3"). The system uses a mirroring scheme wherein copies of the data blocks D1, D2, D3 are respectively stored in different nodes than the originals. A copy of the first data block D1 is stored on the second node as mirror data block M1. A copy of the second data block D2 is stored on the third node as mirror data block M2. A copy of the third data block D3 is stored on a fourth node (i.e., "Node 4") as mirror data block M3. Thus, the data blocks D1, D2, D3 have corresponding copies M1, M2, M3 such that if one of the nodes fail, information stored on that node can be recovered.

In this example, the second node fails and the information stored therein is lost. Thus, the second data block D2 and the first mirror data block M1 are lost. Since copies were made, a user can continue to access all of the information. In other words, the first data block D1 and the second mirror data block M2 comprise copies of the lost information. However, to maintain the mirrored protection scheme, the system copies the first data block D1 to the fourth node as a new data block Q1 and copies the second mirror data block M2 to the first node as a new data block Q2. An artisan will recognize from the disclosure herein that the new data blocks Q1, Q2 can be copied to other nodes as long as copies of information are not stored on the same node as the information itself.

FIG. 9 is a dependency graph illustrating one embodiment of a mirror recovery transaction 900 as described in FIG. 8. The mirror recovery transaction 900 creates the new data blocks Q1, Q2 after the first mirror data block M1 and the second data block D2 are lost. The mirror recovery transaction 900 begins with a layout procedure 902 that determines what information was lost and where the backup information is located under the old layout. Thus, the layout procedure 902 determines that the first data block D1 and the second mirror data block M2 are to be copied. The layout procedure 902 also determines in which nodes to store the new data blocks Q1, Q2. As discussed above, the layout procedure 902 determines to store the new data block Q1 in the fourth node and the new data block Q2 in the first node. The layout procedure 902 may determine where to store the new data blocks Q1, Q2 based on factors such as the next available node, the file size of the corresponding file, the anticipated access rate, the available storage capacity, the CPU utilization, and the network utilization.

Once the system completes the layout procedure 902, the system can execute a read D1 command 904, an allocate Q1 command, a read M2 command 910 and an allocate Q2 command 912. The read D1 command 904 reads the first data block D1 from the first node and stores it in a temporary buffer in the first node. In other embodiments, read commands may store the data blocks in their correct location in the cache hierarchy. Later, the data may be flushed so as not to pollute the cache, or may be left in the cache. The allocate Q1 command 906 allocates space in a memory location in the fourth node where the new data block Q1 will be stored. The read M2 command 910 reads the second mirror data M2 from the third node and stores it in a temporary buffer in the third node. The allocate Q2 command 912 allocates space in a memory location in the first node where the new data block Q2 will be stored.

After executing the read D1 command 904 and the allocate Q1 command 906, the system executes a write Q1 command 918. The write Q1 command 918 writes the copy of the first data block D1 (i.e., the information read by the read D1 command 904 and stored in the temporary buffer in the first node) to the memory location in the fourth node allocated by the allocate Q1 command 906. In one embodiment, the system executes a transfer command (not shown) to move the copied first data block D1 from the temporary buffer or cache location in the first node to a temporary buffer or cache location in the fourth node before writing the copy to the memory location in the fourth node as Q1. In other embodiments, the system may include a cache for remote data and a cache for local data. When data is moved from a remote location to a local location, the data may be moved into the local cache.

After executing the read M2 command 910 and the allocate Q2 command 906, the system executes a write Q2 command 920. The write Q2 command 920 writes the copy of the second mirror data block M2 (i.e., the information read by the read M2 command 910) to the memory location in the first node allocated by the allocate Q2 command 912. As discussed above, in one embodiment, the system executes a transfer command (not shown) to move the copied second mirror data block M2 from the temporary buffer or cache location in the third node to a temporary buffer or cache location in the first node before writing the copy to the memory location in the first node as Q2.

After executing the allocate Q1 command 906 and the allocate Q2 command Q2, the system executes a set block addresses command 922. The set block addresses command 922 stores an address corresponding to the allocated memory location in the fourth node and an address corresponding to the allocated memory location in the first node to a metadata data structure or an inode describing the file.

After executing the write Q1 command 918, the write Q2 command 920, and the set block addresses command 922, the mirror recovery transaction 900 ends with a commit protocol 930. In the commit protocol 930, the first node, and the fourth node agree to commit to the mirror recovery transaction 900 or to abort the mirror recovery transaction 900 to maintain atomicity.

If sufficient system resources are available, the system can execute the read D1 command 904, the allocate Q1 command 906, the read M2 command 910, and the allocate Q2 command 912 in parallel. Other commands such as the write Q1 command 918, the write Q2 command 920, and the set block addresses command 922 can also be executed in parallel. Thus, system resource usage is increased and delay that would be caused by sequential execution is reduced.

D. Parity Write Transaction

Figure 10:
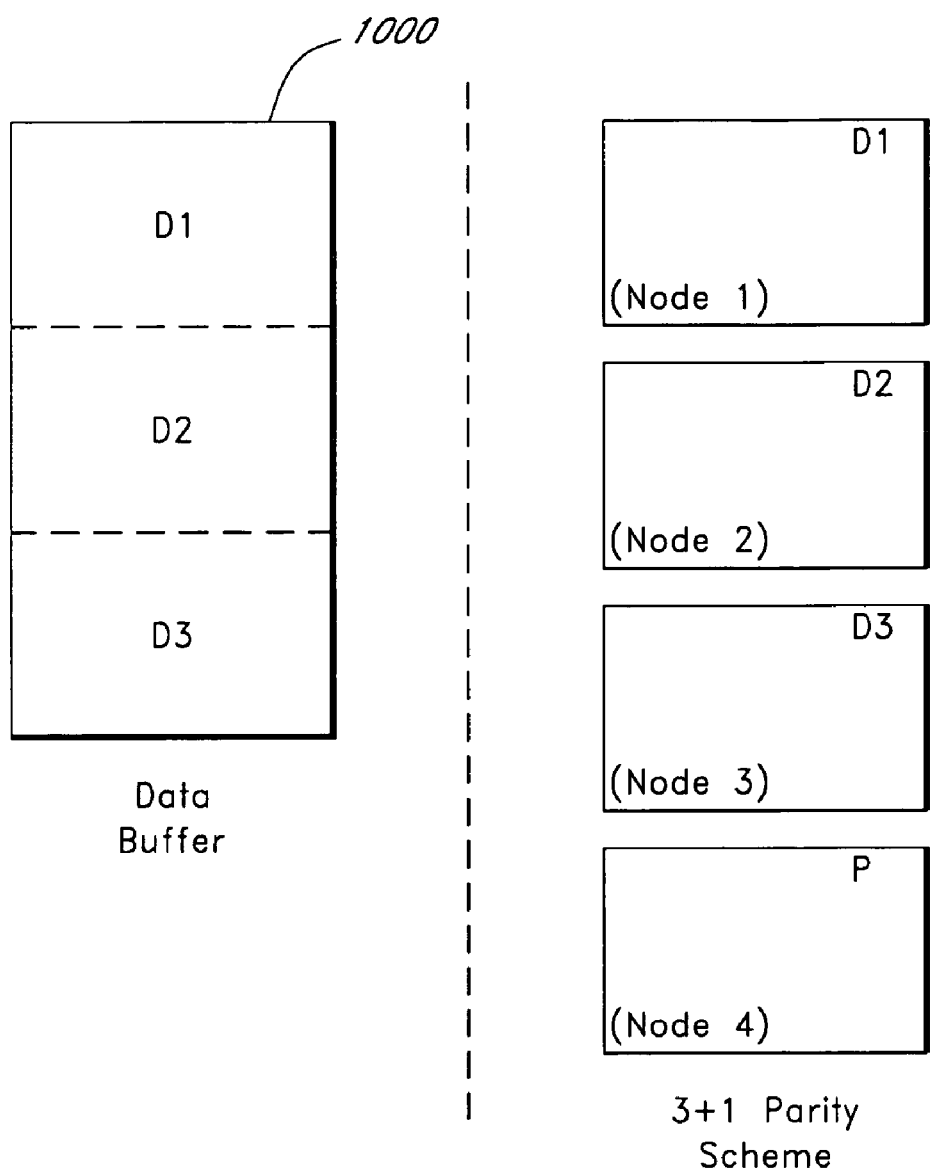
FIG. 10 is an exemplary block diagram according to one embodiment representing data blocks written to nodes in a distributed file system using a 3+1 parity scheme.

FIG. 10 is an exemplary block diagram according to one embodiment representing data blocks written to nodes in a distributed file system using a 3+1 parity scheme. As shown in FIG. 10, a first data block D1, a second data block D2 and a third data block D3 are written from a data buffer 1000 to three nodes. The first data block D1 is written to a first node (i.e., "Node 1"), the second data block D2 is written to a second node (i.e., "Node 2"), and the third data block D3 is written to a third node (i.e., "Node 3").

For illustrative purposes, the data blocks D1, D2, D3 are written to different nodes and (as discussed below) correspond to the same block of parity information. However, data blocks in some embodiments are stored contiguously on the same node to reduce the amount of time it takes to complete a write transaction. For example, a file comprising thirty-two data blocks may be written using a 2+1 parity scheme by writing the first sixteen data blocks to a first memory device and the next sixteen data blocks to a second memory device. Then, sixteen blocks of parity information can be written to a third memory device. Each block of parity information corresponds to two data blocks, one written on the first memory device and the other written on the second memory device. For example, the first data block stored on the first memory device and the seventeenth data block stored on the second memory device may be XORed to create a parity block stored on the third memory device.

Returning to FIG. 10, parity data P corresponding to the three data blocks D1, D2, D3 is written to a fourth node (i.e., "Node 4"). In one embodiment, the system generates the parity data P by performing an XOR operation on the three data blocks D1, D2, D3 though other error correction schemes may be used. The XOR operation can be performed on a bit-by-bit, byte-by-byte, or block-by-block basis. If one of the four nodes fails, the information on the failed node can be recovered by performing an XOR operation on the other three nodes. If the first node fails, for example, the first data block D1 can be recovered by XORing the second data block D2, the third data block D3 and the parity data P, and then storing the recovered first data block D1 in a new location. In such a case, the parity data P would not need to be recomputed.

Figure 11:
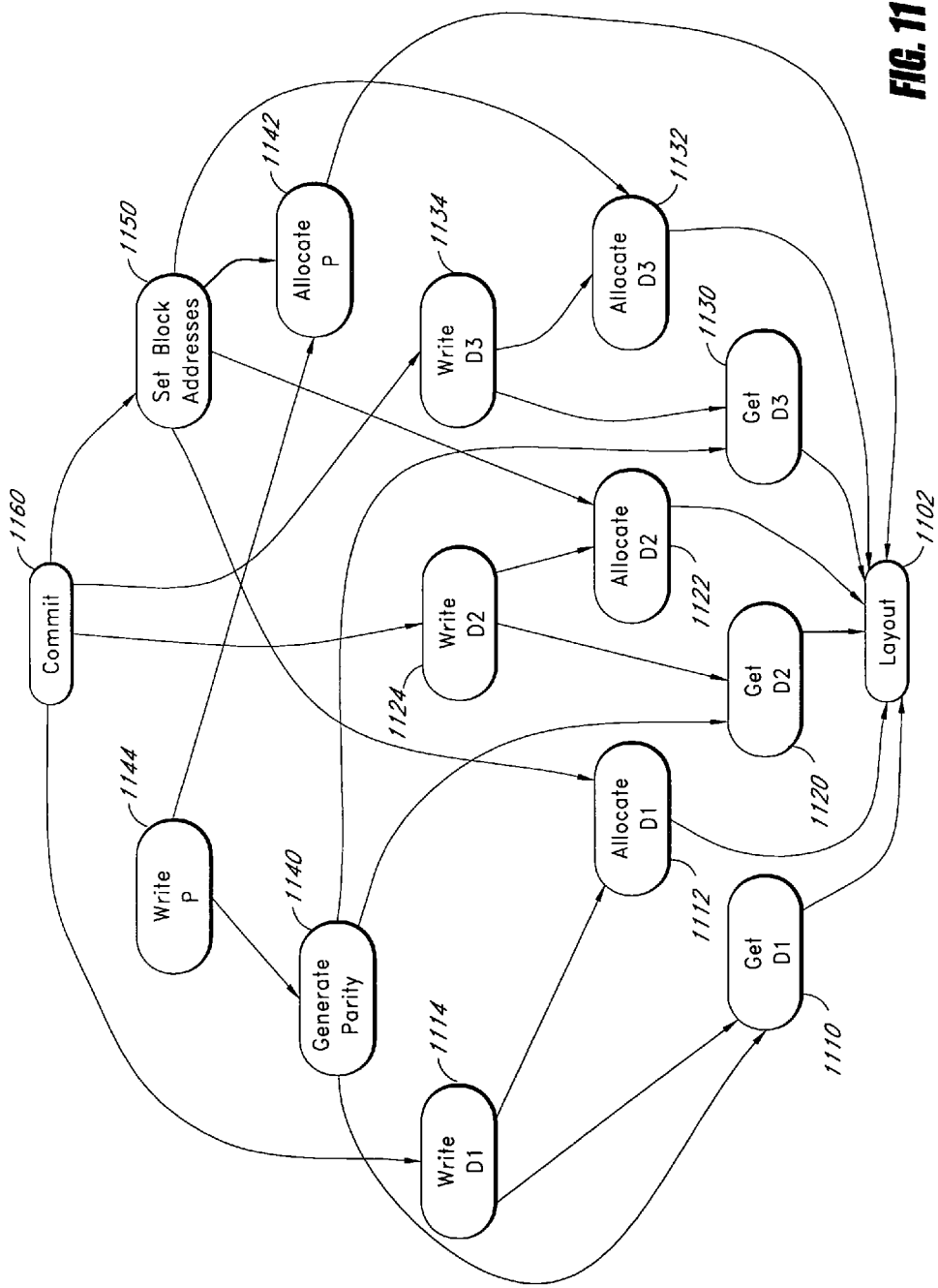
FIG. 11 is a dependency graph illustrating one embodiment of a parity write transaction for writing data blocks and parity data in the 3+1 parity scheme as described in FIG. 10.

FIG. 11 is a dependency graph illustrating one embodiment of a parity write transaction 1100 for writing the data blocks D1, D2, D3 and the parity data P in the 3+1 parity scheme as described in FIG. 10. The parity write transaction 1100 begins with a layout procedure 1102 that determines which nodes the data blocks D1, D2, D3 and the parity data P will be stored. As discussed above, in this example, the layout procedure 1102 determines that the first data block D1 will be written to the first node, the second data block D2 will be written to the second node, the third data block D3 will be written to the third node, and the parity data P will be written to the fourth node.

The parity write transaction 1100 includes a get D1 command 1110, an allocate D1 command 1112, and a write D1 command 1114. Once the system executes the layout procedure 1102, the system executes the get D1 command 1110 to retrieve the first data block D1 from the buffer 1000, and the allocate D1 command 1112 to allocate space in a memory location in the first node for the first data block D1. After the system executes the get D1 command 1110 and the allocate D1 command 1112, the system executes the write D1 command to write the first data block D1 to the memory location in the first node.

The parity write transaction 1100 also includes a get D2 command 1120, an allocate D2 command 1122, and a write D2 command 1124. Once the system executes the layout command 1102, the system executes the get D2 command 1120 to retrieve the second data block D2 from the buffer 1000, and the allocate D2 command 1122 to allocate space in a memory location in the second node for the second data block D2. After the system executes the get D2 command 1120 and the allocate D2 command 1122, the system executes the write D2 command to write the second data block D2 to the memory location in the second node.

The parity write transaction 1100 also includes a get D3 command 1130, an allocate D3 command 1132, and a write D3 command 1134. Once the system executes the layout command 1102, the system executes the get D3 command 1130 to retrieve the third data block D3 from the buffer 1000, and the allocate D3 command 1132 to allocate space in a memory location in the third node for the third data block D3. After the system executes the get D3 command 1130 and the allocate D3 command 1132, the system executes the write D3 command to write the third data block D3 to the memory location in the third node.

The parity write transaction 1100 further includes a generate parity command 1140, an allocate P command 1142 and a write P command 1144. After the system executes the get D1 command 1110, the get D2 command 1120 and the get D3 command 1130, the system executes the generate parity command 1140. The generate parity command 1140 generates the parity data P, creates a temporary buffer and stores the parity data P therein. As discussed above, in one embodiment the generate parity command 1140 generates the parity data P by performing an XOR operation on the first data block D1, the second data block D2, and the second data block D3.

Once the layout command 1102 is complete, the system executes the allocate P command 1142 to allocate space in a memory location in the fourth node for the parity data P. After executing the generate parity command 1140 and the allocate P command 1142, the system executes the write P command 1144 to write the parity data P to the memory location in the fourth node.

Once the allocate D1 command 1112, the allocate D2 command 1122, the allocate D3 command 1132, and the allocate P command 1142 execute to completion, the system executes a set block addresses command 1150. The set block addresses command 1150 stores addresses corresponding to the memory locations allocated in the first node, the second node, the third node, and the fourth node to a metadata data structure or an inode describing the file corresponding to the data blocks D1, D2, D3.

After the write D1 command 1114, the write D2 command 1124, the write D3 command 1134, the write P command 1144, and get block address 1150 execute to completion, the parity write transaction 1100 ends with a commit protocol 1160. In the commit protocol 1160, the first node, second node, third node, and fourth node agree to commit or abort the parity write transaction 1100 to maintain atomicity. As with the other examples discussed above, the parity write transaction 1100 increases system resource overlap and reduces latency by executing a plurality of commands in parallel. For example, the first node, the second node, the third node, the fourth node, or a combination of the forgoing can each be executing commands at the same time rather than waiting while one command is executed at a time.

E. Restripe Transaction

Figure 12:
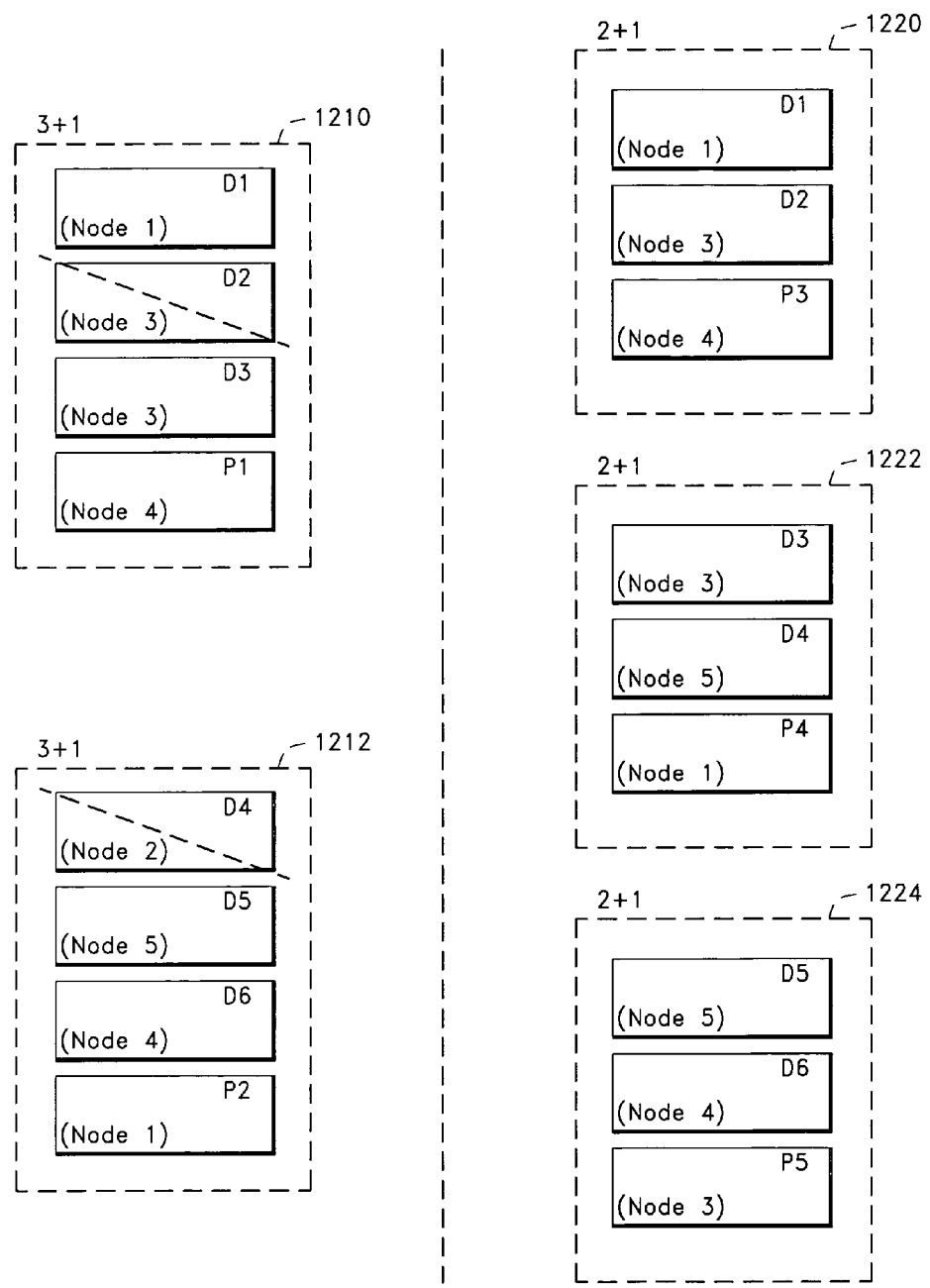
FIG. 12 is an exemplary block diagram according to one embodiment representing data restriping from a 3+1 parity scheme to a 2+1 parity scheme in a distributed file system.

FIG. 12 is an exemplary block diagram according to one embodiment representing data restriping from a 3+1 parity scheme to a 2+1 parity scheme in a distributed file system. The restriping procedure uses parity information under the 3+1 parity scheme to recover lost information and generates new parity information for the 2+1 parity scheme.

The 3+1 parity scheme includes a first 3+1 parity group 1210 and a second 3+1 parity group 1212. The first 3+1 parity group 1210 includes a first data block D1 stored on a first node (i.e., "Node 1"), a second data block D2 stored in a second node (i.e., "Node 2"), a third data block D3 stored in a third node (i.e., "Node 3"), and first parity data P1 stored in a fourth node (i.e., "Node 4"). In one embodiment, the first parity data P1 is generated by performing an XOR operation on the first data block D1, the second data block D2, and the third data block D3.

The second 3+1 parity group 1212 includes a fourth data block D4 stored on the second node, a fifth data block D5 stored on a fifth node (i.e., "Node 5"), a sixth data block D6 stored on the fourth node, and a second parity data P2 stored on the first node. In one embodiment, the second parity data P2 is generated by performing an XOR operation on the fourth data block D4, the fifth data block D5, and the sixth data block D6.

In this example, the second node fails resulting in the loss of the second data block D2 and the fourth data block D4. Upon detecting failure of the second node, the system recovers the second data block D2 by performing an XOR operation on the first data block D1, the third data block D3, and the first parity data P1. Similarly, the system recovers the fourth data block D4 by performing an XOR operation on the fifth data block D5, the sixth data block D6, and the second parity data P2. Since the first 3+1 parity group 1210 and the second 3+1 parity group 1212 both used the failed second node, the system converts from a 3+1 parity scheme to a 2+1 parity scheme to help preserve the ability to recover from node failure.

The 2+1 parity scheme includes a first 2+1 parity group 1220, a second 2+1 parity group 1222, and a third 2+1 parity group 1224. The first 2+1 parity group 1220 includes the first data block D1 stored on the first node, the recovered second data block D2 stored on the third node, and third parity data P3 stored on the fourth node. The system generates the third parity data P3 by performing an XOR operation on the first data block D1 and the second data block D2.

The second 2+1 parity group 1222 includes the third data block D3 stored on the third node, the recovered fourth data block D4 stored on the fifth node and fourth parity data P4 stored on the first node. The system generates the fourth parity data by performing an XOR operation on the third data block D3 and the fourth data block D4. The third 2+1 parity group 1224 includes the fifth data block D5 stored on the fifth node, the sixth data block D6 stored on the sixth node, and fifth parity data P5 stored on the third node. The system generates the fifth parity data by performing an XOR operation on the fifth data block D5 and the sixth data block D6.

Figure 13A:
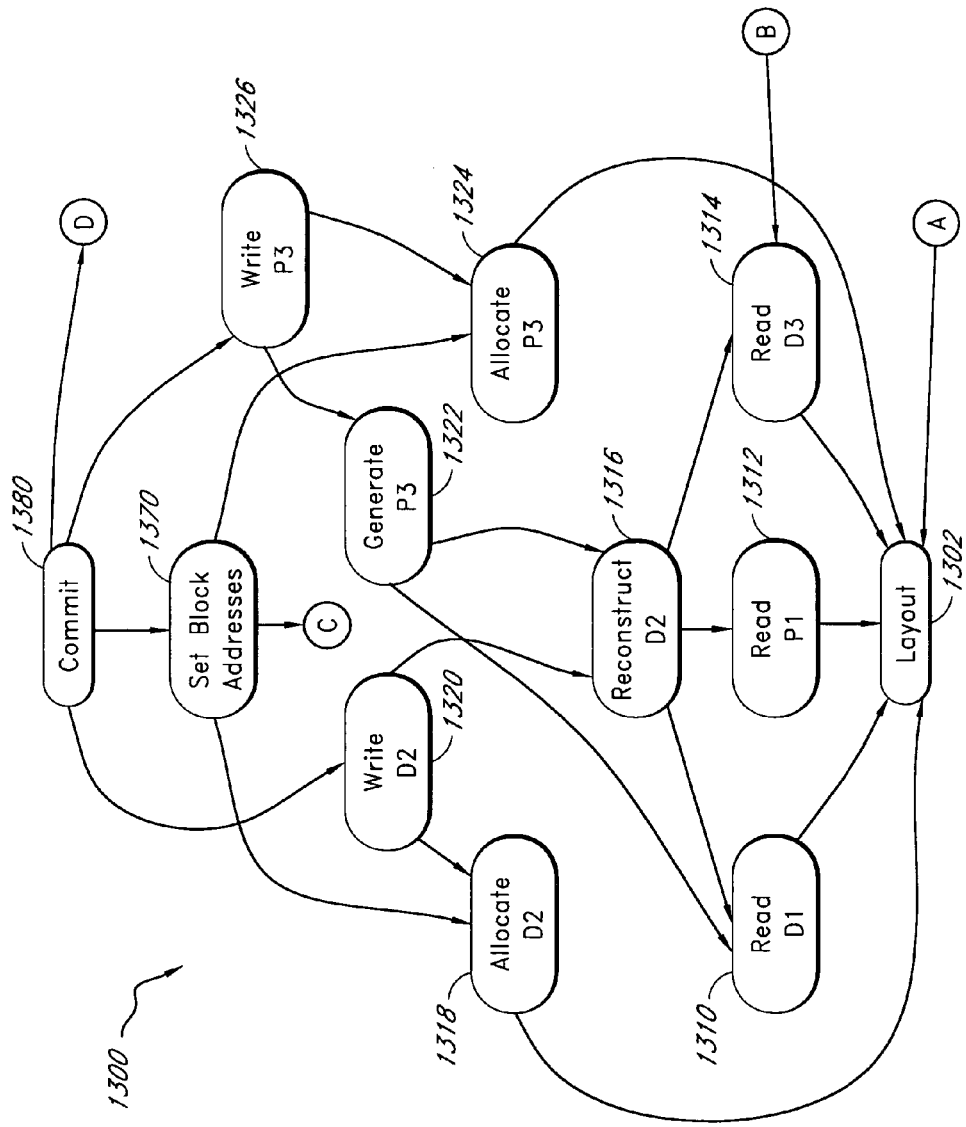
FIGS. 13A and 13B are a dependency graph according to one embodiment of a restripe transaction for converting from the 3+1 parity scheme to the 2+1 parity scheme as described in relation to FIG. 12.
Figure 13B:
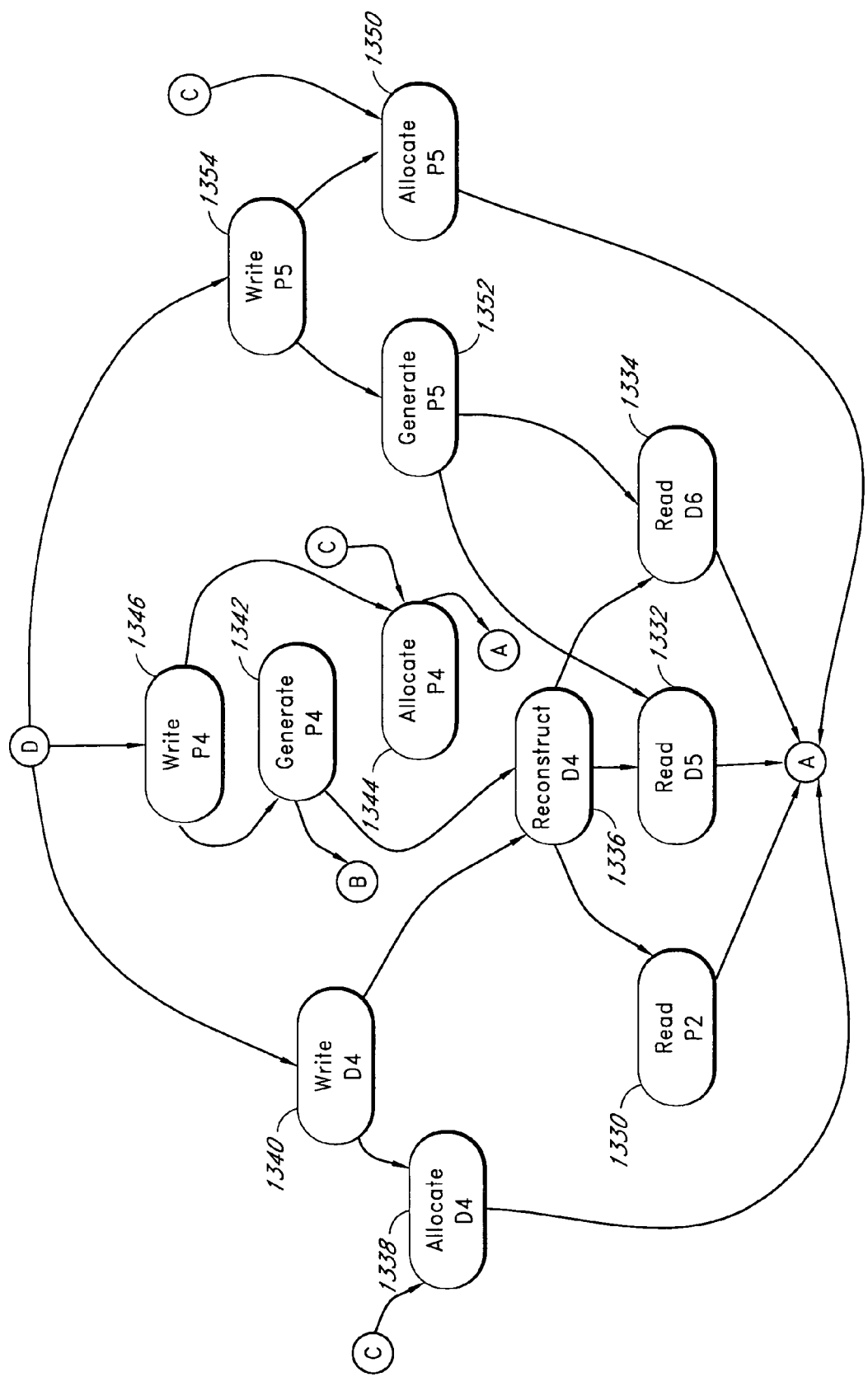

FIGS. 13A and 13B are a dependency graph according to one embodiment of a restripe transaction for converting from the 3+1 parity scheme to the 2+1 parity scheme as described in relation to FIG. 12. As discussed above, in this example the restriping occurs after the second node fails. The restripe transaction 1300 begins with a layout procedure 1302 that defines the first 2+1 parity group 1220, the second 2+1 parity group 1222, and the third 2+1 parity group 1224 as discussed above. In one embodiment, to reduce the amount of operations performed by the restripe transaction 1300, the layout procedure 1302 does not change the storage location of the first data block D1, the third data block D3, the fifth data block D5 and the sixth data block D6.

Once the system performs the layout procedure 1302, the system creates the first 2+1 parity group 1220, the second 2+1 parity group 1222, and the third 2+1 parity group 1224.

1. Generating the First 2+1 Parity Group

To create the first 2+1 parity group 1220, the restripe transaction 1300 reconstructs the second data block D2 and generates the third parity data P3. The restripe transaction 1300 includes a read D1 command 1310 that reads the first data block D1 from the first node, a read P1 command 1312 that reads the first parity data P1 from the fourth node, and a read D3 command 1314 that reads the third data block D3 from the third node.

The restripe transaction 1300 includes a reconstruct D2 command 1316 that reconstructs the second data block D2 that was lost when the second node failed. After the system executes the read D1 command 1310, the read P1 command 1312, and the read D3 command 1314, the reconstruct D2 command 1316 performs an XOR operation on the first data block D1, the third data block D3, and the first parity data P1 to reconstruct the second data block D2. The reconstruct D2 command 1316 stores the reconstructed second data block D2 in a temporary buffer. If the restripe transaction 1300 was keeping the previous parity (for example, keeping the 3+1 parity scheme), after the second data block D2 had been reconstructed, the second data block D2 could be stored in a new location without having to recalculate any new parity. In this example, however, the restripe transaction 1300 recovers from a failed node and also performs a conversion from the 3+1 parity scheme to the 2+1 parity scheme; thus, new party data is generated.

The restripe transaction 1300 also includes an allocate D2 command 1318. The allocate D2 command 1318 allocates space in the third node for the second data block D2. After executing the allocate D2 command 1318 and the reconstruct D2 command 1316, the system executes a write D2 command 1320 that writes the reconstructed second data block D2 in the allocated space in the third node.

After the reconstruct D2 command 1316 executes, the system also executes a generate P3 command 1322 that creates the third parity data P3 by performing an XOR operation on the first data block D1 and the recovered second data block D2. The restripe transaction 1300 includes an allocate P3 command 1324 that allocates space in the fourth node for the third parity data P3. Once the generate P3 command 1322 and the allocate P3 command 1324 are complete, the system executes a write P3 command 1326 that writes the third parity data to the fourth node.

2. Generating the Second 2+1 Parity Group

To create the second 2+1 parity group 1222, the restripe transaction 1300 reconstructs the fourth data block D4 and generates the fourth parity data P4. The restripe transaction 1300 includes a read P2 command 1330 that reads the second parity data P2 from the first node, a read D5 command 1332 that reads the fifth data block D5 from the fifth node, and a read D6 command 1334 that reads the sixth data block D6 from the sixth node.

The restripe transaction 1300 includes a reconstruct D4 command 1336. After the system executes the read P2 command 1330, the read D5 command 1332, and the read D6 command 1334, the reconstruct D4 command 1336 performs an XOR operation on the second parity data P2, the fifth data block D5, and the sixth data block D6 to reconstruct the fourth data block D4. The reconstruct D4 command 1336 stores the reconstructed fourth data block D4 in a temporary buffer.

The restripe transaction 1300 also includes an allocate D4 command 1338. The allocate D4 command 1338 allocates space in the fifth node for the fourth data block D4. Once the reconstruct D4 command 1336 and the allocate D4 command 1338 are complete, the system executes a write D4 command 1340 that writes the reconstructed fourth data block D4 in the allocated space in the fifth node.

After the read D3 command 1314 and the reconstruct D4 command 1346 execute, the system also executes a generate P4 command 1342 that creates the fourth parity data P4 by performing an XOR operation on the third data block D3 and the recovered fourth data block D4. The restripe transaction 1300 includes an allocate P4 command 1344 that allocates space in the first node for the fourth parity data P4. Once the generate P4 command 1342 and the allocate P4 command 1344 are complete, the system executes a write P4 command 1346 that writes the fourth parity data to the first node.

3. Generating the Third 2+1 Parity Group

To create the third 2+1 parity group 1224, the restripe transaction 1300 computes the fifth parity data P5 corresponding to the fifth data block D5 and the sixth data block D6. The restripe transaction 1300 includes an allocate P5 command 1350, a generate P5 command 1352, and a write P5 command 1354. The allocate P5 command 1350 allocates space in the third node for the fifth parity block P5.

Once the read D5 command 1332 and the read D6 command 1334 are complete, the system executes the generate P5 command 1352. The generate P5 command 1352 creates the fifth parity data P5 by performing an XOR operation on the fifth data block D5 and the sixth data block D6. After executing the allocate P5 command 1350 and the generate P5 command 1352, the system executes a write P5 command 1354 that writes the fifth parity data P5 to the space allocated in the third node.

4. Ending the Restripe Transaction

After executing the allocate D2 command 1318, the allocate P3 command 1324, the allocate D4 command 1338, the allocate P4 command 1334, and the allocate P5 command 1350, the system executes a set block addresses command 1370. The set block addresses command 1370 stores addresses corresponding to the memory locations allocated in the first node, the third node, the fourth node, and the fifth node during the restripe transaction 1300. The addresses are stored in a metadata data structure or an inode describing the file corresponding to the data blocks D1, D2, D3, D4, D5, D6.

After the write D2 command 1320, the write P3 command 1326, the write D4 command 1340, the write P4 command 1346, the write P5 command 1354, and the set block addresses command 1370 execute, the restripe transaction 1300 ends with a commit protocol 1380. In the commit protocol 1380, the first node, third node, fourth node, and fifth node agree to commit or abort the restripe transaction 1300 to maintain atomicity.

As with the other examples discussed above, the restripe transaction 1300 increases system resource overlap and reduces latency by executing a plurality of commands in parallel. For example, the first node, the third node, the fourth node, fifth node, or a combination of the forgoing can each be executing commands at the same time rather than waiting while the distributed file system executes one command at a time.

It is noted that the example transactions were provided to illustrate the invention and that other transactions, commands, dependences and/or priorities may be used.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Appendix

This Appendix forms a part of the patent application entitled "DISTRIBUTED SYSTEM WITH ASYNCHRONOUS EXECUTION SYSTEMS AND METHODS,".

This Appendix includes a list of exemplary commands and pseudocode for an execution engine that reduces latency in a distributed file system by executing commands as sufficient information and system resources become available. It should be recognized, however, that the list of exemplary commands and pseudocode is not meant to limit the scope of the invention, but only to provide details for a specific embodiment. This Appendix includes the Appendices incorporated by reference above from U.S. Provisional Application No. 60/623, 846, filed Oct. 29, 2004 entitled "Distributed System with Asynchronous Execution Systems and Methods," and U.S. Provisional Application No. 60/628,527, filed Nov. 15, 2004 entitled "Distributed System with Asynchronous Execution Systems and Methods," which are hereby incorporated by reference herein in their entirety.

Exemplary Commands

Commands are a (verb, waiters, priority) tuple. Some exemplary verbs are listed below:
1. ALLOC(dev,lbns)—Alloc space for the specified blocks
2. FEC(fec_instructions)—Compute FEC group
3. FREE(baddr_range_array)—Free blocks (used by restriper)
4. READ(baddr,dest)—Read the specified block
5. RECONSTRUCT(lbn)—Reconstruct the specified block
6. SETBLKADDRS(void)—Set block addresses into inodes
7. WRITE(data,baddr)—Write data from block to location
8. XFER—Move blocks from a vp to a devvp.
9. ZERO_READ(baddr,dest)—Read the specified block, assuming it was all zero (bzero unaffected region)

| PSEUDOCODE FOR EXECUTION ENGINE |
| --- |
| ```
engine( ) {
   while ((any commands outstanding || runnables_remain( ))
       && !engine->aborted )
     msleep(&engine);
     foreach command in high_runnable_list( ) {
       engine->commands_outstanding++;
       command->run( );
     }
     foreach command in med_runnable_list( ) {
       engine->commands_outstanding++;
       command->run( );
     }
     foreach command in low_runnable_list( ) {
       engine->commands_outstanding++;
       command->run( );
     }
  }
}
command_callback( ) {
   for waiter in waiters {
     waiter.wait_count--;
     if (waiter.wait_count == 0)
        engine_add_runnable_and_wakeup(waiter);
   }
   free(myself);
}
engine_add_runnable_and_wakeup(waiter) {
   if (!engine->aborted) {
     switch(waiter->priority) {
       case HIGH;
         high_runnable_list.append(waiter);
       case MED;
         high_runnable_list.append(waiter);
       case LOW;
         high_runnable_list.append(waiter);
     }
   }
   engine->commands_outstanding--;
   wakeup(engine);
}
``` |

What is claimed is:

1. A method of performing a transaction in a distributed system, the method comprising:
   obtaining, by a first computing node, a first command and a second command that define functions to be performed in the transaction, wherein the first command includes dependency information that comprises a first local dependency that must be satisfied before the first command is executed and a first remote dependency that must be satisfied before the first command is executed, and wherein the second command includes dependency information that comprises a second dependency that must be satisfied before the second command is executed;
   holding the first command in a waiting state until the first local dependency is satisfied;
   determining that the second dependency is satisfied;
   causing the execution of the second command;
   determining that the first local dependency is satisfied and that there is a first remote dependency that must be satisfied;
   transmitting the first command to a second computing node for asynchronous execution, the second computing node to determine when to perform the functions defined by the first command based on the first remote dependency included in the first command; and determining that the first command has been executed at the second computing node.

2. The method of claim 1, wherein determining that the first local dependency is satisfied comprises determining that the second command has been executed.

3. The method of claim 1, wherein the first command and the second command include prioritization information.

4. The method of claim 1, wherein causing the execution of the second command comprises performing the function defined by the second first command on the first computing node.

5. The method of claim 1, wherein causing the execution of the second command comprises:
   transmitting the second command to the second computing node for execution, the second computing node to determine when to perform the functions defined by the second command.

6. The method of claim 5, further comprising:
   receiving data from the second computing node, wherein the data from the second computing node corresponds to data resulting from the execution of at least one of the first command and the second command.

7. The method of claim 1, wherein the first computing node and the second computing node comprise smart storage units.

8. The method of claim 1, wherein the transaction is selected from a group comprising one or more of:
   a write transaction;
   a mirror transaction;
   a mirror recovery transaction;
   a parity write transaction; and
   a restripe transaction.

9. A distributed system comprising:
   a plurality of commands, each command structured to include dependency information and priority information; and
   a plurality of nodes comprising a first node and a second node, each node comprising at least one computer processor,
   wherein the first node is configured to:
      obtain a first command and a second command that define functions to be performed in a transaction, wherein the first command includes dependency information that comprises a first dependency that must be satisfied before the first command is executed, and wherein the second command includes dependency information that comprises a second local dependency that must be satisfied before the second command is executed and a second remote dependency that must be satisfied before the second command is executed;
      process the dependency information included in the first command;
      execute the first command only after the first dependency is satisfied;
      process the dependency information included in the second command;
      transmit the second command to a second node for asynchronous execution only after the second local dependency is satisfied; and
      determine that the second node has executed the second command; and
   wherein the second node is configured to:
      receive the second command from the first node;
      process the dependency information associated with the second command; and
      execute the second command only after the second remote dependency is satisfied.

10. The distributed system of claim 9, wherein the second local dependency is satisfied after the first command has been executed.

11. The distributed system of claim 9, wherein the first dependency is satisfied after the second command has been executed.

12. The distributed system of claim 9, wherein the first node is further configured to execute the second command subsequent to the second local dependency being satisfied.

13. The distributed system of claim 9, wherein the second node is further configured to transmit a third command to the first computing device for asynchronous execution, the first computing device to determine when to perform the functions defined by the third command based on dependency information included in the third command.

14. The distributed system of claim 9, wherein the second node is further configured to transmit result data to the first node, wherein the result data corresponds to data resulting from the execution of the second command.

15. The distributed system of claim 9, wherein the plurality of nodes comprise smart storage units.

16. The distributed system of claim 9, wherein the transaction is selected from a group comprising one or more of:
   a write transaction;
   a mirror transaction;
   a mirror recovery transaction;
   a parity write transaction; and
   a restripe transaction.

* * * * *

UNITED STATES PATENT AND TRADEMARK OFFICE
CERTIFICATE OF CORRECTION

PATENT NO. : 8,051,425 B2
APPLICATION NO. : 11/262308
DATED : November 1, 2011
INVENTOR(S) : Peter J. Godman and Darren P. Schack It is certified that error appears in the above-identified patent and that said Letters Patent is hereby corrected as shown below:

At Column 21, Line 10, in Claim 4, delete "first".

Signed and Sealed this
Fourth Day of September, 2012

David J. Kappos
*Director of the United States Patent and Trademark Office*